US012743412B2

(12) United States Patent
Tarquinio et al.

(10) Patent No.: US 12,743,412 B2
(45) Date of Patent: Sep. 22, 2026

(54) OPTIMIZE OBJECT LISTING IN DISTRIBUTED OBJECT STORAGE SYSTEM USING VALIDATED LISTING KEYS

(71) Applicant: Dell Products L.P., Round Rock, TX (US)

(72) Inventors: Brandon Tarquinio, Seattle, WA (US); Grigorii Skripko, Snohomish, WA (US); Yuxi Cui, Kenmore, WA (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 19/072,904

(22) Filed: Mar. 6, 2025

(65) Prior Publication Data

US 2026/0267849 A1 Sep. 10, 2026

(51) Int. Cl.
*G06F 16/23* (2019.01)
*G06F 16/22* (2019.01)

(52) U.S. Cl.
CPC ...... *G06F 16/2365* (2019.01); *G06F 16/2282* (2019.01)

(58) Field of Classification Search
CPC ......................... G06F 16/2365; G06F 16/2282
See application file for complete search history.

(56) References Cited

U.S. PATENT DOCUMENTS 5,734,818 A * 3/1998 Kern ................... G06F 11/2064 714/E11.117
2013/0151478 A1* 6/2013 Li ....................... G06F 16/2365 707/690

(Continued)

OTHER PUBLICATIONS

Torres-Rojas, Francisco J., Mustaque Ahamad, and Michel Raynal. "Timed consistency for shared distributed objects." Proceedings of the eighteenth annual ACM symposium on Principles of distributed computing. 1999.*

(Continued)

*Primary Examiner* — Mohsen Almani
(74) *Attorney, Agent, or Firm* — Amin, Turocy & Watson, LLP

(57) ABSTRACT

A bucket owner computing system may request a lookup/listing of object information associated with objects stored by object owner computing system(s). The bucket and object owner systems may not be configured to atomically update object information therebetween. Object information key-value pair(s) at the bucket owner may comprise object information associated with object(s) stored at object owner(s) and may comprise object information consistency state indication(s). After object creation, the bucket owner may retrieve object information from the object owner(s) and update the consistency state indication(s) to indicate that object information in the key-value pair(s) is consistent with current state(s) of the object(s) at the object owner(s). Responsive to the request, based on object information key-value pair(s) indicating object information consistency between the bucket and object owners, the bucket owner may list the object information from the object information key-value pair(s) without retrieving again the object information from the object owner(s).

20 Claims, 12 Drawing Sheets

(56) References Cited

U.S. PATENT DOCUMENTS

| | | | | |
|---|---|---|---|---|
| 2014/0032504 | A1* | 1/2014 | Golab | G06F 16/245 707/690 |
| 2018/0074865 | A1* | 3/2018 | Rungta | G06F 1/24 |
| 2019/0228487 | A1* | 7/2019 | Raphael | G06F 16/93 |
| 2019/0272337 | A1* | 9/2019 | Stewart | G06F 16/2272 |
| 2023/0244692 | A1* | 8/2023 | Eltsufin | G06F 9/54 707/618 |

OTHER PUBLICATIONS

Schattka, Moritz. "Algorithms for Timed Consistency Models." arXiv preprint arXiv:1310.7205 (2013).*

Guiav Arc'h, WO 2023/285019 A1, International Filing Date: May 30, 2022 (May 30, 2022).*

Kao, Ben, et al. "Maintaining temporal consistency of discrete objects in soft real-time database systems." IEEE Transactions on Computers 52.3 (2003): 373-389.*

* cited by examiner

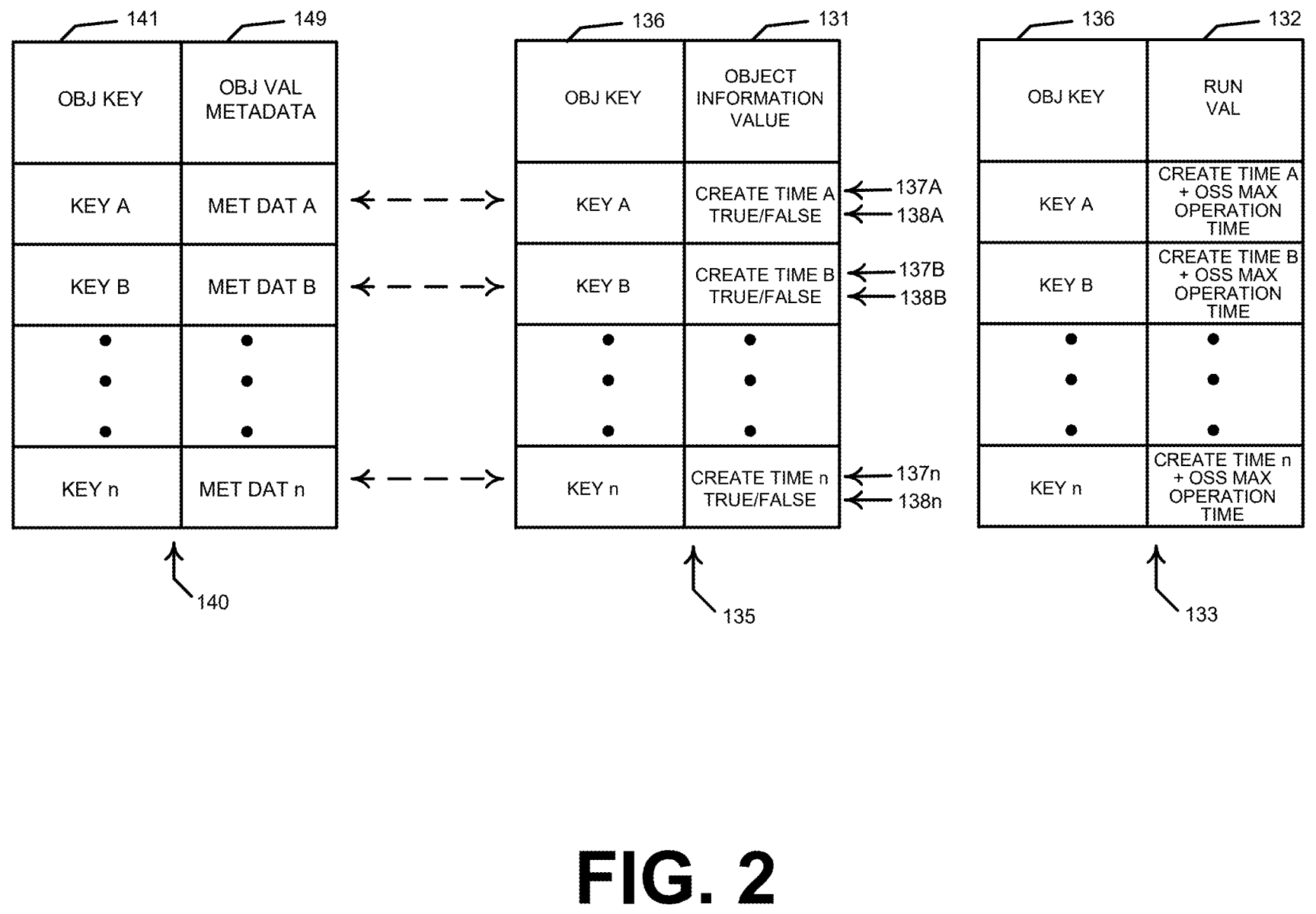

140

| OBJ KEY (141) | OBJ VAL METADATA (149) |
| --- | --- |
| KEY A | MET DAT A |
| KEY B | MET DAT B |
| • • • | • • • |
| KEY n | MET DAT n |

135

| OBJ KEY (136) | OBJECT INFORMATION VALUE (131) |
| --- | --- |
| KEY A | CREATE TIME A (137A) TRUE/FALSE (138A) |
| KEY B | CREATE TIME B (137B) TRUE/FALSE (138B) |
| • • • | • • • |
| KEY n | CREATE TIME n (137n) TRUE/FALSE (138n) |

133

| OBJ KEY (136) | RUN VAL (132) |
| --- | --- |
| KEY A | CREATE TIME A + OSS MAX OPERATION TIME |
| KEY B | CREATE TIME B + OSS MAX OPERATION TIME |
| • • • | • • • |
| KEY n | CREATE TIME n + OSS MAX OPERATION TIME |

FIG. 2

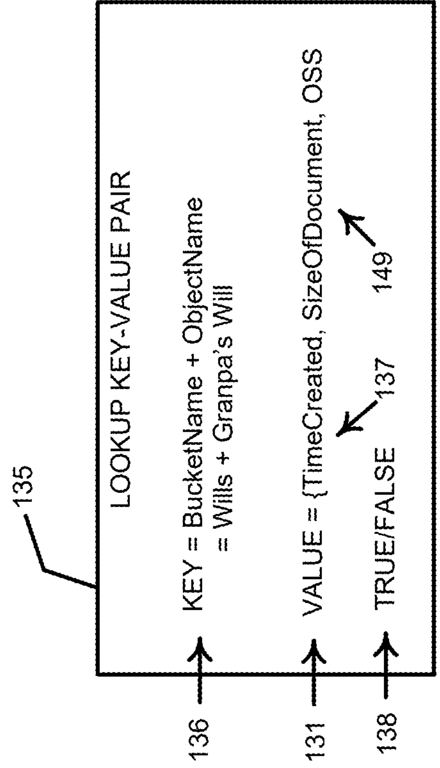
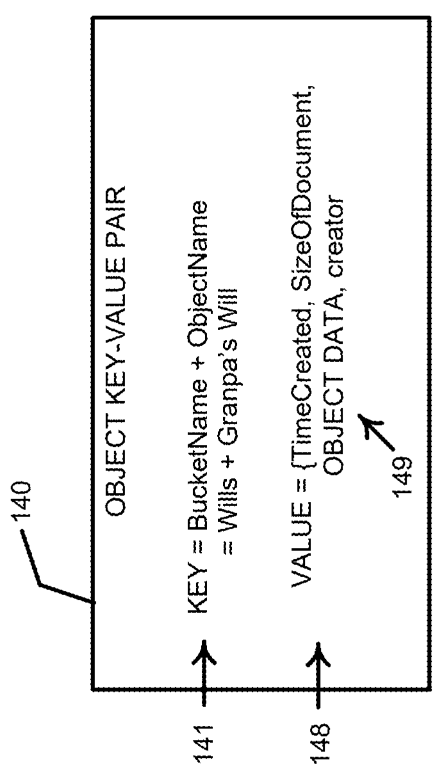
FIG. 4

Figure 7:
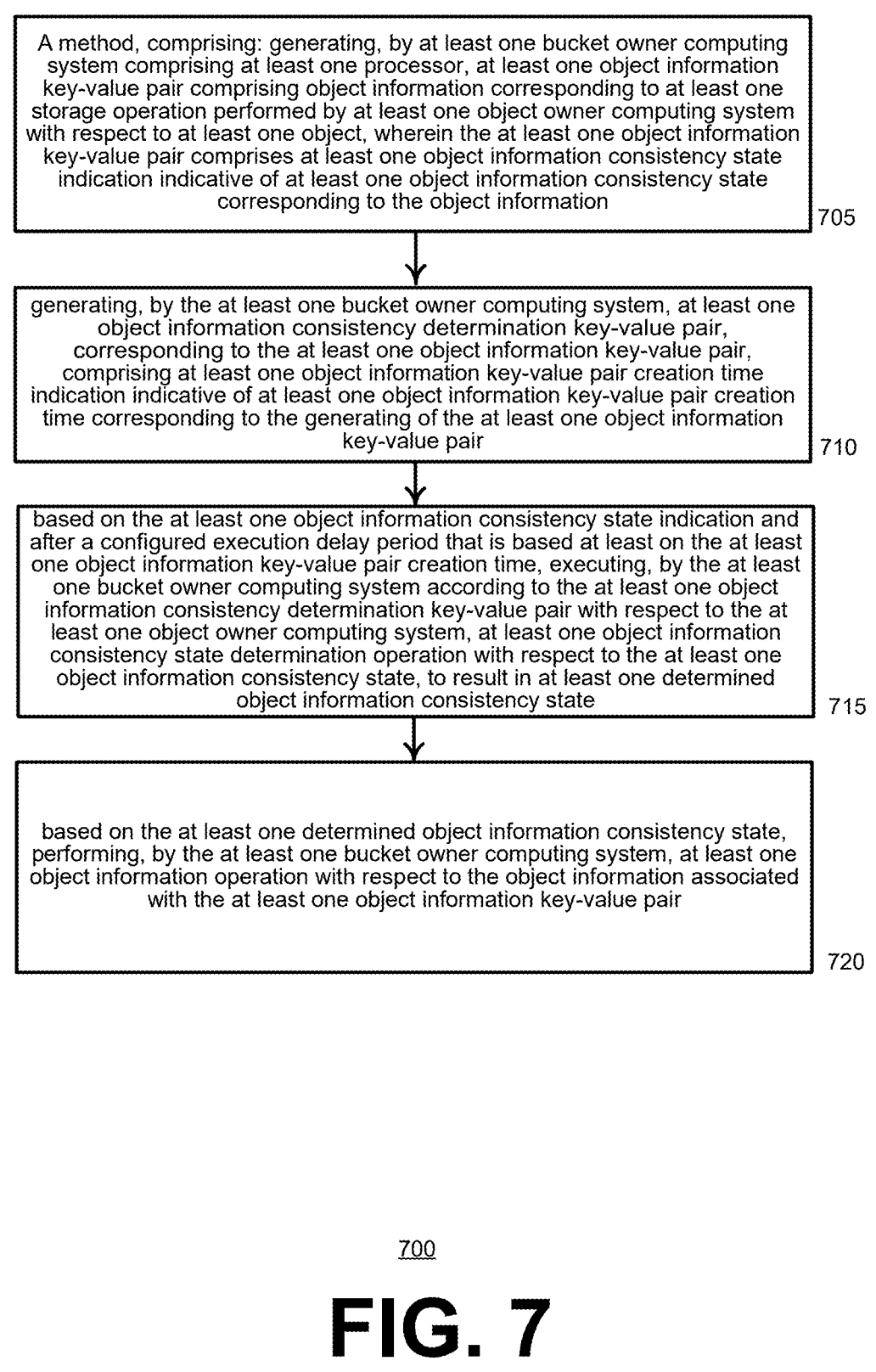

A method, comprising: generating, by at least one bucket owner computing system comprising at least one processor, at least one object information key-value pair comprising object information corresponding to at least one storage operation performed by at least one object owner computing system with respect to at least one object, wherein the at least one object information key-value pair comprises at least one object information consistency state indication indicative of at least one object information consistency state corresponding to the object information

705 generating, by the at least one bucket owner computing system, at least one object information consistency determination key-value pair, corresponding to the at least one object information key-value pair, comprising at least one object information key-value pair creation time indication indicative of at least one object information key-value pair creation time corresponding to the generating of the at least one object information key-value pair

710 based on the at least one object information consistency state indication and after a configured execution delay period that is based at least on the at least one object information key-value pair creation time, executing, by the at least one bucket owner computing system according to the at least one object information consistency determination key-value pair with respect to the at least one object owner computing system, at least one object information consistency state determination operation with respect to the at least one object information consistency state, to result in at least one determined object information consistency state

715 based on the at least one determined object information consistency state, performing, by the at least one bucket owner computing system, at least one object information operation with respect to the object information associated with the at least one object information key-value pair

Figure 8:
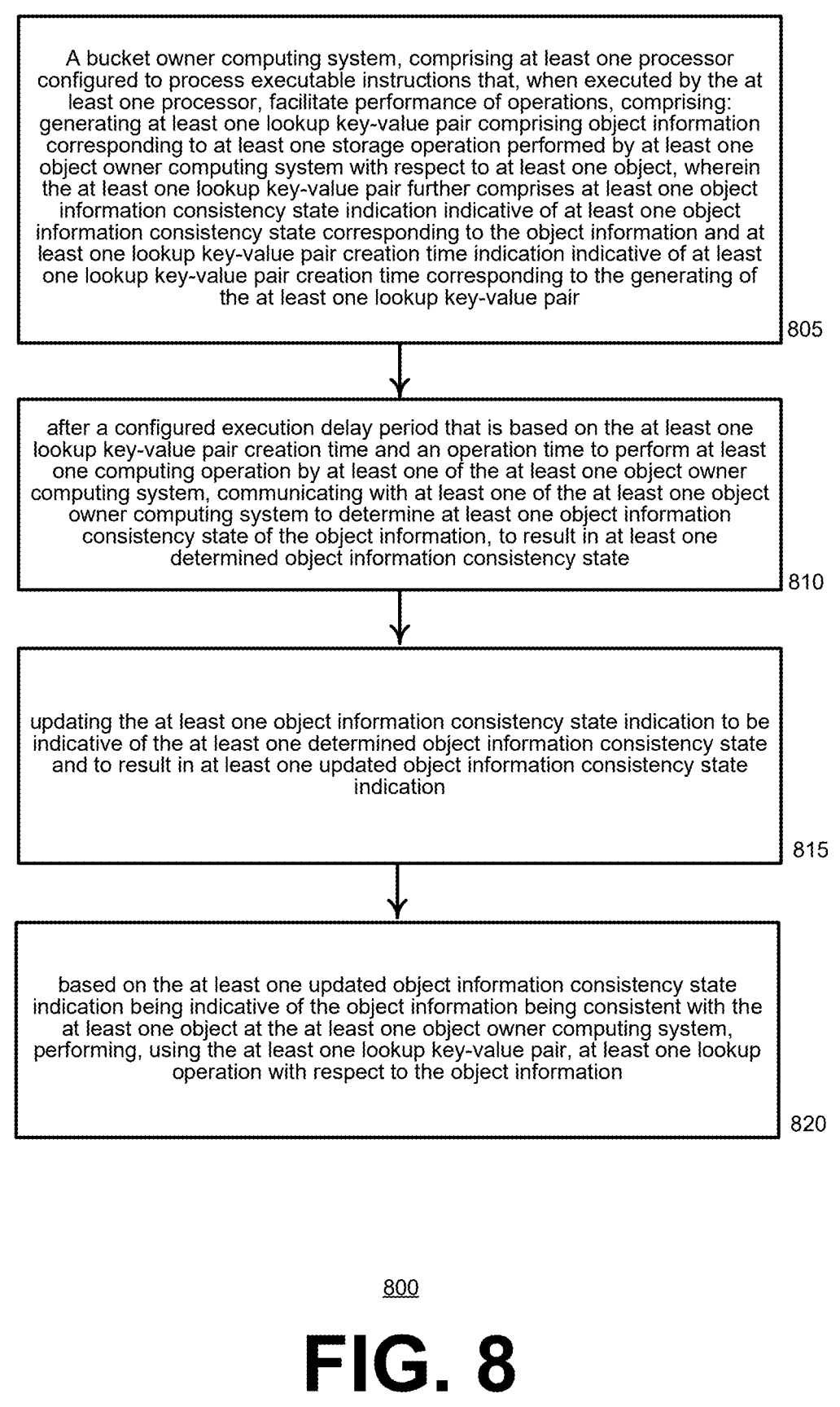

A bucket owner computing system, comprising at least one processor configured to process executable instructions that, when executed by the at least one processor, facilitate performance of operations, comprising: generating at least one lookup key-value pair comprising object information corresponding to at least one storage operation performed by at least one object owner computing system with respect to at least one object, wherein the at least one lookup key-value pair further comprises at least one object information consistency state indication indicative of at least one object information consistency state corresponding to the object information and at least one lookup key-value pair creation time indication indicative of at least one lookup key-value pair creation time corresponding to the generating of the at least one lookup key-value pair

805 after a configured execution delay period that is based on the at least one lookup key-value pair creation time and an operation time to perform at least one computing operation by at least one of the at least one object owner computing system, communicating with at least one of the at least one object owner computing system to determine at least one object information consistency state of the object information, to result in at least one determined object information consistency state

810 updating the at least one object information consistency state indication to be indicative of the at least one determined object information consistency state and to result in at least one updated object information consistency state indication

815 based on the at least one updated object information consistency state indication being indicative of the object information being consistent with the at least one object at the at least one object owner computing system, performing, using the at least one lookup key-value pair, at least one lookup operation with respect to the object information

Figure 9:
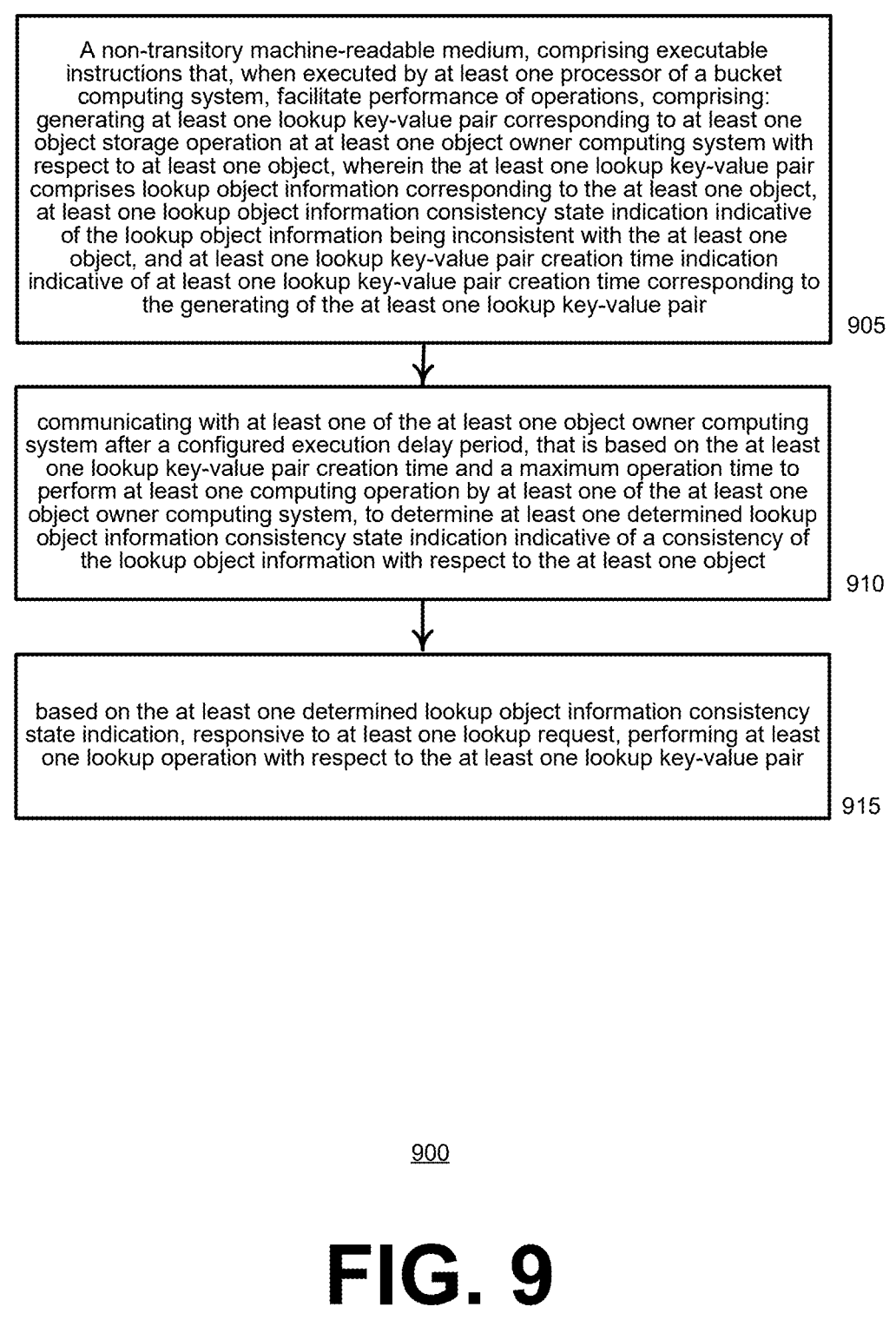

A non-transitory machine-readable medium, comprising executable instructions that, when executed by at least one processor of a bucket computing system, facilitate performance of operations, comprising: generating at least one lookup key-value pair corresponding to at least one object storage operation at at least one object owner computing system with respect to at least one object, wherein the at least one lookup key-value pair comprises lookup object information corresponding to the at least one object, at least one lookup object information consistency state indication indicative of the lookup object information being inconsistent with the at least one object, and at least one lookup key-value pair creation time indication indicative of at least one lookup key-value pair creation time corresponding to the generating of the at least one lookup key-value pair

905 communicating with at least one of the at least one object owner computing system after a configured execution delay period, that is based on the at least one lookup key-value pair creation time and a maximum operation time to perform at least one computing operation by at least one of the at least one object owner computing system, to determine at least one determined lookup object information consistency state indication indicative of a consistency of the lookup object information with respect to the at least one object

910 based on the at least one determined lookup object information consistency state indication, responsive to at least one lookup request, performing at least one lookup operation with respect to the at least one lookup key-value pair

OPTIMIZE OBJECT LISTING IN DISTRIBUTED OBJECT STORAGE SYSTEM USING VALIDATED LISTING KEYS

BACKGROUND

According to conventional techniques, data stored by a computing system may be created at, copied to, replicated to, deleted from, or updated at a target computing system, which may be referred to as an object owner computing system. Multiple communication between a bucket owner computing system, which may have assigned, or associated, at least one data object at the object computing system to a category 'bucket' and may perform operations with respect to the at least one data object according to the category based on metadata corresponding to the data. The metadata may be updated to reflect current state(s) of the data via multiple communication messages between the bucket computing system and the object owner computing system upon a request at the bucket owner computing system for information associated with the at least one data object.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise generating, by at least one bucket owner computing system comprising at least one processor, at least one object information key-value pair comprising object information corresponding to at least one storage operation performed by at least one object owner computing system with respect to at least one object. The at least one object information key-value pair may comprise at least one object information consistency state indication indicative of at least one object information consistency state corresponding to the object information. The method may further comprise generating, by the at least one bucket owner computing system, at least one object information consistency determination key-value pair, corresponding to the at least one object information key-value pair, comprising at least one object information key-value pair creation time indication indicative of at least one object information key-value pair creation time corresponding to the generating of the at least one object information key-value pair. Based on the at least one object information consistency state indication and after a configured execution delay period that is based at least on the at least one object information key-value pair creation time, the method may further comprise executing, by the at least one bucket owner computing system according to the at least one object information consistency determination key-value pair with respect to the at least one object owner computing system, at least one object information consistency state determination operation with respect to the at least one object information consistency state, to result in at least one determined object information consistency state. Based on the at least one determined object information consistency state, the method may further comprise performing, by the at least one bucket owner computing system, at least one object information operation with respect to the object information associated with the at least one object information key-value pair.

In an example embodiment, the at least one storage operation performed by at least one object owner computing system with respect to storage of at least one object may comprise at least one of: creation of the at least one object, updating of the at least one object, or deleting of the at least one object.

In an example embodiment, the at least one determined object information consistency state may correspond to the object information associated with the at least one object information key-value pair being consistent with the at least one object.

In an example embodiment, the at least one object information key-value pair may comprise at least one object information key-value pair timestamp indicative of at least one update time corresponding to at least one update of the at least one object information key-value pair.

In an example embodiment, the at least one object information consistency state indication may be indicative that the object information associated with the at least one object information key-value pair accurately corresponds to the at least one object.

In an example embodiment, the configured execution delay period may be further based on an operation time, associated with at least one of the at least one object owner computing system, to perform at least one computing operation. The operation time may be a maximum operation time that at least one of the at least one object owner computing system may need, or consume, in performing an operation.

In an example embodiment, the at least one bucket owner computing system and the at least one object owner computing system may be configured to atomically update, or may not be capable of atomically updating of, the at least one object information key-value pair and at least one object key-value pair corresponding to the at least one object. For example, if the at least one bucket owner computing system and the at least one object owner computing system may be located at different geographic sites.

In an example embodiment, the at least one object information key-value pair may be usable, by the at least one bucket owner computing system, to facilitate at least determining an availability of the at least one object at the at least one object owner computing system, routing at least one copy, read, update, or delete request corresponding to the at least one object to at least one of the at least one object owner computing system corresponding to the object information, or generating a listing of the object information corresponding to at least one bucket to which the at least one object information key-value pair corresponds.

In an example embodiment, the method may further comprise avoiding, by the at least one bucket owner computing system, performing the at least one object information consistency state determination operation after the at least one determined object information consistency state indication has been determined.

In an example embodiment, the at least one object information consistency state indication may be FALSE, the at least one determined object information consistency state may be TRUE, and the executing of the at least one object information consistency state determination operation may comprise changing the at least one object information consistency state indication from being FALSE to being TRUE.

In an example embodiment, the method may further comprise receiving, by the at least one bucket owner computing system, at least one lookup request corresponding to the at least one object. Based on the at least one object information consistency state indication being determined to be TRUE, and responsive to the at least one lookup request, the method may further comprise performing, by the at least one bucket owner computing system, the at least one object information operation without, after the executing of the at least one object information consistency state determination operation, communicating, by the at least one bucket owner computing system, with the at least one object owner computing system. According to the embodiment, the performing of the at least one object information operation may comprise performing a lookup or a listing of the object information corresponding to the at least one object with respect to which the at least one object information consistency state indication is TRUE.

In an example embodiment, the method may further comprise avoiding, by the at least one bucket owner computing system, communication with the at least one object owner computing system in connection with the performing of the at least one object information operation.

In an example embodiment, the at least one object information key-value pair may comprise at least one metadata indication indicative that the at least one object information operation is to be performed with respect to metadata, associated with the at least one object, indicated by the at least one metadata indication.

In an example embodiment, the performing of the at least one object information operation may comprise, responsive to a request, performing at least one lookup operation or at least one listing operation.

In an example embodiment, at least one of the at least one object information consistency state indication may be FALSE, the performing of the at least one object information operation may comprise generating, by the at least one bucket owner computing system, a list of the at least one object that is available at the at least one object owner computing system. Based on the at least one of the at least one object information consistency state indication being determined to be FALSE, the performing of the at least one object information operation may further comprise avoiding, by the at least one bucket owner computing system, listing, in the list, the object information that corresponds to the at least one object and that is associated with at least one object information key-value pair. According to the example embodiment, the method may further comprise retrieving, by the at least one bucket owner computing system from the at least one object owner computing system, the object information corresponding to the at least one object with respect to which the at least one object information consistency state indication is FALSE, to result in retrieved object information. The performing of the at least one object information operation may comprise listing, or including in the list, the retrieved object information.

In another example embodiment, a bucket owner computing system, may comprise at least one processor configured to process executable instructions that, when executed by the at least one processor, facilitate performance of operations that may comprise generating at least one lookup key-value pair comprising object information corresponding to at least one storage operation performed by at least one object owner computing system with respect to at least one object. The at least one lookup key-value pair may further comprise at least one object information consistency state indication indicative of at least one object information consistency state corresponding to the object information and at least one lookup key-value pair creation time indication indicative of at least one lookup key-value pair creation time corresponding to the generating of the at least one lookup key-value pair. After a configured execution delay period that is based on the at least one lookup key-value pair creation time and an operation time to perform at least one computing operation by at least one of the at least one object owner computing system, the operations may further comprise communicating with at least one of the at least one object owner computing system to determine at least one object information consistency state of the object information, to result in at least one determined object information consistency state and updating the at least one object information consistency state indication to be indicative of the at least one determined object information consistency state and to result in at least one updated object information consistency state indication. Based on the at least one updated object information consistency state indication being indicative of the object information being consistent with the at least one object at the at least one object owner computing system, the operations may further comprise performing, using the at least one lookup key-value pair, at least one lookup operation with respect to the object information.

In an example embodiment, the performing of the at least one lookup operation may comprise indicating the object information associated with the at least one object in response to a lookup request or in response to a bucket object list request.

In an example embodiment, the at least one object information consistency state may correspond to at least one state of metadata, corresponding to the at least one object and indicated by the at least one lookup key-value pair. The at least one updated object information consistency state indication may comprise at least one flag set to TRUE.

In yet another example embodiment, a non-transitory machine-readable medium may comprise executable instructions that, when executed by at least one processor of a bucket computing system, facilitate performance of operations that may comprise generating at least one lookup key-value pair corresponding to at least one object storage operation at at least one object owner computing system with respect to at least one object. The at least one lookup key-value pair may comprise lookup object information corresponding to the at least one object, at least one lookup object information consistency state indication indicative of the lookup object information being inconsistent with the at least one object, and at least one lookup key-value pair creation time indication indicative of at least one lookup key-value pair creation time corresponding to the generating of the at least one lookup key-value pair. The operation may further comprise communicating with at least one of the at least one object owner computing system after a configured execution delay period, that is based on the at least one lookup key-value pair creation time and a maximum operation time to perform at least one computing operation by at least one of the at least one object owner computing system, to determine at least one determined lookup object information consistency state indication indicative of a consistency of the lookup object information with respect to the at least one object. Based on the at least one determined lookup object information consistency state indication, responsive to at least one lookup request, the operations may further comprise performing at least one lookup operation with respect to the at least one lookup key-value pair.

In an example embodiment, the at least one object storage operation may comprise at least one of: at least one delete operation with respect to the at least one object or at least one update operation with respect to the at least one object.

The at least one lookup key-value pair may comprise at least one updated lookup key-value pair comprising at least one updated lookup object information consistency state indication, indicative of the lookup object information being inconsistent with the at least one object. The at least one updated lookup key-value pair may comprise at least one updated lookup key-value pair creation time value indication indicative of at least one updated lookup key-value pair creation time corresponding to the at least one updated lookup key-value pair. Based on the at least one updated lookup object information consistency state indication being indicative of the lookup object information being inconsistent with the at least one object, the performing of the at least one lookup operation may comprise avoiding listing of the lookup object information.

BRIEF DESCRIPTION OF THE DRAWINGS

FIG. 2 illustrates example object information key value pairs and associated example object information consistency determination key-value pairs corresponding to example object key value pairs.

FIG. 4 illustrates an example object key-value pair and an example lookup key-value pair.

FIG. 7 illustrates a block diagram of an example method embodiment.

FIG. 8 illustrates a block diagram of an example bucket owner computing system.

FIG. 9 illustrates a block diagram of an example non-transitory machine-readable medium embodiment.

DETAILED DESCRIPTION OF THE DRAWINGS

Figure 1:
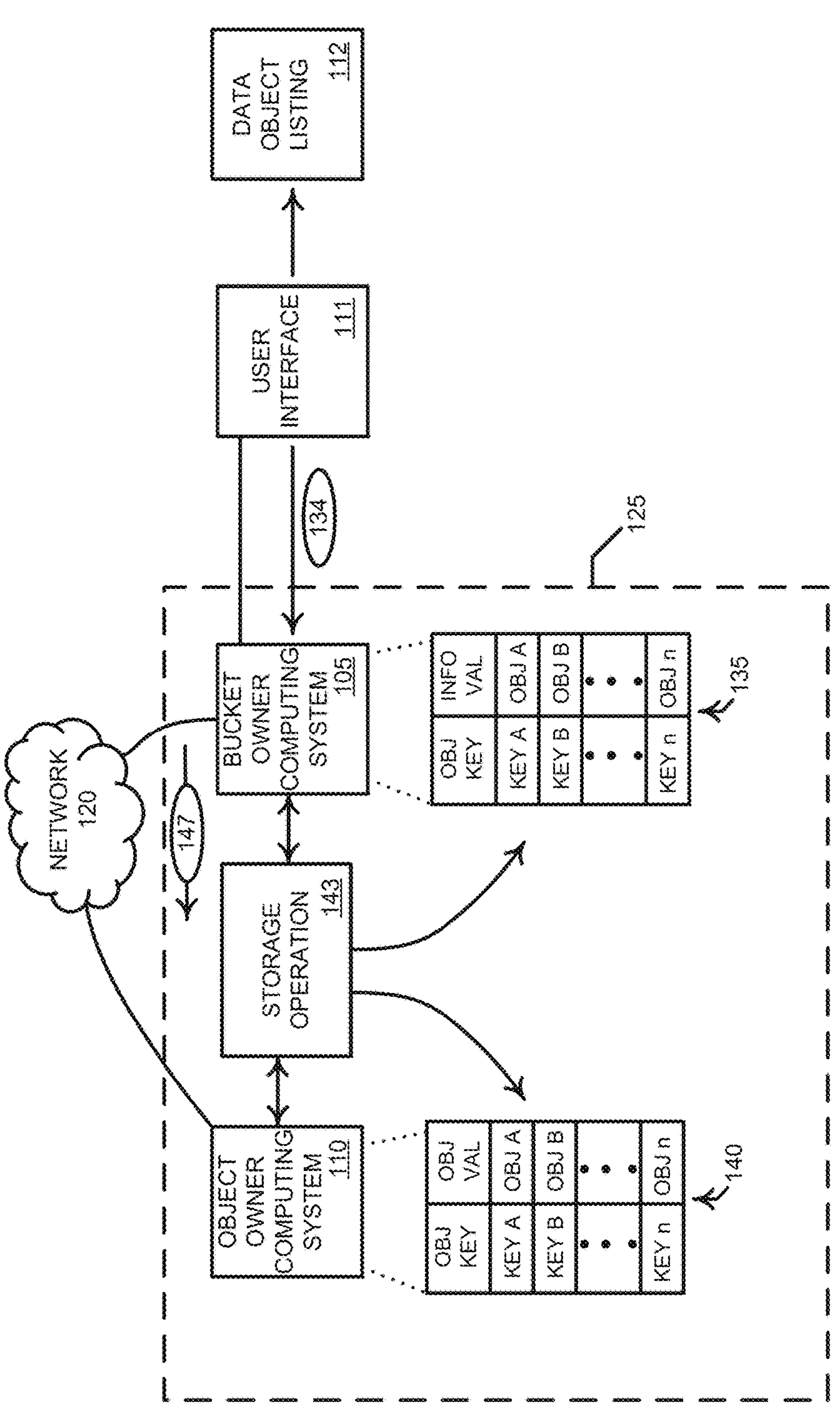
FIG. 1 illustrates a computer networking environment.

As a preliminary matter, it will be readily understood by those persons skilled in the art that the present embodiments are susceptible of broad utility and application. Many methods, embodiments, and adaptations of the present application other than those herein described as well as many variations, modifications, and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms “component,” “system” and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term “facilitate” as used herein is in the context of a system, device or component “facilitating” one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

A computing system may distribute storage of data objects across multiple sites, or multiple computing systems, and can achieve strong consistency by storing a lookup key in a predictable site that points to a site containing the object's, or objects', metadata. In an example embodiment, the lookup keys may be ordered by bucket and then object name and can be used to return to a user a list objects corresponding to a bucket, which may correspond to at least one data category or characteristic (e.g., a bucket may comprise data related to an enterprise's marketing information document files). If the system lacks a mechanism for writing the lookup key and object's/objects' metadata in an atomic operation across the distributed site(s)/system(s), the keys can become inconsistent (e.g., the keys may indicate, or correspond to, metadata that does not reflect a current state of the data to which the metadata corresponds). To facilitate an operation with respect to data objects stored in a distributed fashion, for example a listing of objects that returns a complete list of live objects stored by the computing system, listing logic would need to verify that each lookup key is currently associated with a live object. Using conventional techniques, multiple messages transmitted between multiple sites to facilitate such verification can cause a problem of reduced listing speed (e.g., high latency, experienced at the bucket owner computing system, to list active objects) due to cross-site communication (e.g., multiple, back-and-forth messaging between an object owner computing system and a bucket owner computing system) in response to a request at the bucket owner system for information pertaining to objects stored at one or more object owner computing system (e.g., a request at a bucket owner system for a listing of files or other objects associated with a bucket characteristic, such as, for example, a request for files related to marketing).

Embodiments disclosed herein may solve problems that exist according to conventional techniques, which problems may result from multiple messages being exchanged between an object donor computing system and a bucket owner computing system in connection with performing object information operations, by facilitating confidence at a bucket owner computing system that metadata at the bucket owner computing system and corresponding to at least one object stored at an object owner computing system is indicative of at least one current state corresponding to the at least one object stored at the at least one object owner computing system. A multi-step validation method can asynchronously ensure that an object stored at an object owner computing system and a lookup key-value pair at a bucket owner computing system, are in a consistent state (e.g., the lookup key-value pair reflects a current state of the object) after a create, update, or delete operation is performed with respect to the object. Thus, a bucket owner computing system may perform an object information operation without performing message exchanges with an object owner computing system in response to a request to perform the object information operation. By performing, by a bucket owner computing system, validation of object information at the bucket owner computing system before being requested to perform the object information operation, the bucket owner computing system may determine a consistency state of the object information before performing an operation in response to the request. A consistency state indication, for example a TRUE/FALSE indication or flag, at a bucket owner computing system may be indicative that object information at the bucket owner computing system corresponding to the consistency state indication is valid with respect to a state of at least one object, corresponding to the object information, at an object owner computing system, or the consistency state indication may indicate that object information at the bucket owner computer system is stale with respect to a current state of the object at the object owner computing system. Thus, the bucket owner computing system may, in response to a request to list object information corresponding to at least one object stored by at least one object owner computing system for example, skip in-line validation (e.g., may skip sending/receiving messages with an object owner computing system after receiving a request to list information associated with at least one object at at least object owner computing system to determine a state of the at least one object at the at least one object owner computing system) with respect to objects indicated as being valid at the bucket owner computing system. Avoiding inline validation of object information with respect to objects deemed to be valid may decrease time needed to list, by a bucket owner computing system, object information and may increase accuracy of listing results that may be caused by, for example, service instability or network instability.

According to conventional techniques, keeping global buckets strongly consistent has been a problem due to lack of atomic operation capability between computing systems, or computing system sites, and due to lack of capability to validate that object information at one site/system accurately reflects corresponding object information at another site. According to conventional techniques, keys may be validated in-line after a request to list object information. According to embodiments disclosed herein, listing speed and accuracy may be improved based on key values being pre-validated before a request for listing.

Turning now to FIG. 1, the figure illustrates a network computing system environment 100. At least one computing system 110, respectively located at at least one geographic site/location, may comprise a system/site designated to store at least one object (e.g., at least one data object). At least one computing system 110 may be referred to as at least one object owner computing system or at least one object owner site, either of which may be referred to herein by the abbreviation ("OOS"). Environment 100 may comprise a computing system confederation 125, including multiple computing systems. Confederation 125 may comprise multiple computing systems that are distributed among multiple computing sites. Computing systems associated with confederation 125 be operated by a single entity, for example, an enterprise, a law firm, a medical group, a scientific research business comprising multiple laboratories, a military organization, a blockchain organization that may facilitate cryptocurrency creation or usage, and the like. An OSS may correspond to a single instance of a storage operation performed with respect to an object (e.g., a create operation, an update operation, or a delete operation performed with respect to an object). At a single site/system, multiple key-value ("KV") operations may be performed with respect to a database in an atomic fashion, for example, as a batch operation (e.g., either all operations are performed with respect to a database or none of the operations are performed with respect to the database). For example, if Batch1={operation 1, operation 2, . . . , operation n} is successful then operation 1 through operation n are all successfully performed to the database, but if Batch1 fails then none of operation 1–operation n are performed to the database. However, confederation 125 may comprise sites/systems that are unable to perform atomic operation across multiple sites of the confederation.

Confederation 125 may comprise a bucket owner computing system 105 that may facilitate performing at least one object information operation with respect to at least one object that may be stored at at least one object owner system 110. Bucket owner computing system 105 may be referred to herein as a bucket owner system or a bucket owner site, either of which may be referred to herein by the abbreviation ("BOS"). BOS 105 may facilitate determining object information corresponding to at least one object that may be stored by at least one OOS 110 in response to at least one object information operation request 134. Request 134 may be generated automatically or in response to input via user interface 111, which may generate or provide object information determined in response to the request. For example, request 134 may comprise a request for object information corresponding to at least one object stored by at least one OOS 110 and a result of performing an object information operation in response to the request may be a listing 112 by BOS 105 of object information corresponding to the at least one object that may be stored by at least one OOS. A 'bucket' may refer to information related to one or more objects having at least one common characteristic. For example, a bucket corresponding to a business may correspond to object information related to marketing. Thus, a request 134 by BOS 105 for information associated with objects that may be stored by at least one OOS 110 may comprise a request indicative of a request for object information, (e.g., files or metadata associated therewith) stored by the at least one OOS, that pertains to marketing. Similarly, a bucket corresponding to a law firm BOS 105 may correspond to object information related to wills and a request 134 may comprise a request for files stored by the at least one OSS that pertain to wills, or a particular will. Consistency, or a consistency state, may refer to how accurate or 'up-to-date' object information, corresponding to an object, at one site of confederation 125 may be with respect to object information corresponding to the same object at another site of confederation 125. For example, object information 135 at BOS 105 that may correspond to at least one object stored at at least one OOS 110 may be deemed consistent if the object information at the BOS accurately reflects object information 140 associated with the at least one object stored at the at least one OOS.

Object information 140 may comprise at least one object-KV pair stored in a database at at least one OOS 110, wherein the at least one object-KV may comprise, or may be indicative of, metadata and data references corresponding to at least one object that may be, or that may not be, stored by the at least one OOS. To facilitate achieving strong consistency with object information 135, which may comprise at least one object information key-value pair corresponding to at least one bucket, an object-KV pair should have a single primary owner site (e.g., an OOS 110) such that all Create, Read, Update, or Delete operations ("CRUD") are facilitated by the particular OOS. An OOS 110 should be a site/system with respect to which an initial storage operation 143 (e.g., an initial create object request) may be directed.

At least one information object key-value pair may comprise object information 135, for example a lookup KV may correspond to at least one object corresponding to the at least one storage operation 143. An object information KV pair comprising object information 135 may be referred to as an object information KV pair 135. An object information-KV pair 135 may point to, or indicate, an OOS 110 with respect to which a storage operation 143 corresponding to an object associated with the object information-KV 135 has been performed. In an example, multiple lookup-KVs 135 corresponding to a bucket, for example Bucket 1, may be stored at BOS 105, which, for purposes of example, may be referred to as site 1, and a create object request 147 to perform a create operation 143 for a new object A is sent to OOS 110, which, for purposes of example may be referred to as Site2. A lookup-KV pair 135A may comprise object information A corresponding to Object A and may have the context {(Lookup-KV Bucket1 ObjectA)→(Site2)}. An object information KV-pair 135 may be used for multiple purposes. For example, information stored by an object information KV-pair may be used to determine if an object exists at an OOS 110, to direct CRUD requests to an OOS 110 corresponding to an object, or to facilitate listing objects in a bucket corresponding to a bucket.

An initial storage operation 143 (e.g., a create operation) should successfully write both a lookup-KV 135 and corresponding object-KV 140. However, if the two different KV pairs are in different locations (e.g., an object KV pair 140 is generated at, or located at, OOS 110 and the lookup KV pair 135 is generated at, or located at, BOS 105), creation of, or updating of, the two KV pairs may not be capable of being performed atomically. An initial create storage operation 143 may first write a lookup KV 135 so that any concurrent requests 134 for the same object can 'see' the lookup KV pair and determine which site (e.g., BOS 105 or an OOS 110) has been determined to be the site that will store the object created according to the create operation. To facilitate correctness with respect to multiple requests 134, a mutex can be used to facilitate only one thread trying to write the lookup KV pair. Next, create operation 143 may write a corresponding object-KV pair 140 at OOS 110. A read object request 134 can first read the lookup-KV pair 135 and then direct request 134 to OOS 110 to facilitate reading the object KV 140 created by operation 143 so that the OOS 110 can return to BOS 105 object information, which may comprise metadata and other data corresponding to the object created by operation 143, to be presented to a user that may have originated request 134.

If operation 143 is a delete operation, operation 143 may facilitate removing both an object-KV pair 140 corresponding to an object and removing a lookup-KV 135 corresponding to the object. If the two KV pairs exist at the same site then the removing can be done atomically according to a batch (e.g., {REMOVE Lookup-KV, REMOVE Object-KV}). However, if the two keys exist at different sites then the two keys may be removed with separate, non-atomic, operations, in which case the object-KV pair 140 may be removed first and then the corresponding lookup-KV pair 135 may be removed to avoid existence of the object-KV pair at multiple sites (e.g., at multiple BOSs 105).

The terminology 'dangling lookup KV pair' may refer to a lookup KV pair 135 with respect to which a corresponding object KV pair 140 does not exist. This situation may occur when a create operation 143 fails after a corresponding lookup KV pair has been written but before a corresponding object KV pair 140 has been written, or when a delete operation fails after deleting the corresponding object-KV pair but before deleting the corresponding lookup KV pair. It is desirable that a request 134 that is a request to list object information corresponding to at least one object associated with a bucket should return a list of objects corresponding to the bucket for the whole federation 125, which listing may be returned ordered by object name. It is undesirable that a request to list object information corresponding to a bucket returns non-existing objects or fails to return a name of an object that exists in federation 125.

A lookup, or listing, of objects stored by at least one OOS 110 may be facilitated by listing object information indicated by lookup KV pairs associated at BOS 105 with the bucket. Listing of object information indicated by a dangling lookup KV pair may be facilitated by confirming the existence of the object KV in the OOS. However, as discussed above, to facilitate strong consistency between object information, corresponding to an object, indicated by an object KV pair 140 at OOS 110 and object information indicated by a lookup KV pair, if all object information to be listed in response to a request 134 must be verified in response to each request 134 (e.g., according to conventional techniques), listing performance in response to request 134 may be slow due to time needed to perform a read operation at the remote site (e.g., read operation at OOS 110) to read object-KV pairs 140. The latency to read object information at an OOS 110 and provide the information at a BOS 105 may be based on reading of a database that comprises KV pairs 140 as well as communication time for transmitting of messages back and forth between OOS 110 and BOS 105. Furthermore, filtering of dangling keys takes time and then processing additional lookup KV pairs with respect to a particular object takes even more time.

To minimize latency, performing a lookup/listing in response to a request 134 may avoid synchronous verification of object information associated with each object corresponding to a bucket if lookup KV pairs associated with the bucket have been validated by novel asynchronous background operations disclosed herein. According to example embodiments, a lookup-KV pair 135 may comprise at least one indication of metadata to be returned in response to a request 134 with respect to each object indicated in a listing 112. For example, a lookup KV pair 135 may indicate that in response to a request 134 a listing 112 is to list information, such as, for example, object create time, etag information, or object size. An example lookup KV pair 135 may comprise a timestamp indicative of a time when the lookup-KV pair was created, which timestamp may be referred to as lookupCreateTime and may be an object information key-value pair creation time value indication indicative of an object information key-value pair creation time corresponding to generating of the at least one object information key-value pair (e.g., a time corresponding to generating of the lookup KV pair).

In an example embodiment, lookup KV pair 135 may comprise an object information consistency state indication, shown as fields 138 of column 131 in FIG. 2, indicative of at least one object information consistency state corresponding to object information at BOS 105. An object information consistency state indication 138 may comprise a boolean TRUE/FALSE indication, or flag, indicating whether object information in an associated lookup-KV pair 135 can be used to perform an object information operation in response to a request 134 without verifying, with an OSS, that an object-KV pair 140 corresponding to the lookup KV pair exists. An object information consistency state indication 138 may be referred to as an 'isTrusted' flag. An indication 138 may be created when an object information KV pair 135 is created. For example, as shown in FIG. 2, when an object indicated by Key B in column 136 is created, an object information KV pair 135B may be generated with create time indication 137B being indicative of a time corresponding to creation of the object information KV pair and with object information consistency state indication 138B being set to FALSE.

An operation time to perform an operation at an OOS 110 may be a maximum time to perform an operation at the OOS and may be referred to as "MaxOperationTime." The maximum operation time may be the longest time an operation can run at a particular OOS 110 before an executing operation would be terminated by the OOS. Put differently, if an operation starts at a time $T_1$ and a current time is greater than $T_1$+MaxOperationTime then the operation may be deemed, or determined, to have successfully finished, to have failed due to an error, or to have been long running and terminated by the OOS. A novel object information consistency determination key-value pair 133, which may be referred to as a "LookupValidatorJob", may be used to keep an associated lookup KV pair in a state consistent with a state of an object, or object information associated with the object, at an OSS 110 corresponding to the lookup KV pair. At least one object information consistency determination key-value pair 133 may be ordered at BOS 105 by an execution delay time indication 132, or period indication, that may be based on the object information key-value pair creation time value time indication 137 and a maximum execution time 139 of an operation to execute at an OOS 110 with respect to which an object associated with the object information key-value pair may have been created or updated. Indication 132 may be indicative of when a corresponding object information consistency determination may be executed such that an operation to create or update object information at the OOS has likely been performed. Indication 132 may be referred to as "RunAfterTime", which may be configured to be greater than or equal to "LookupCreateTime" 137 plus "MaxOperationTime 139." Via an object key indicated by column 136 of KV pair 133, execution delay period indication 132 may be associated with object information in column 131 associated with the same object key indicated by column 136 of KV pair 135. In an example embodiment, columns 136 may comprise a bucket name or an object name. For example, execution delay period 132B of KV pair 133 may be associated with, or mapped to, object information value create time 137B and object information consistency state indication 138B via Key B in columns 136 of KV pairs 133 and 135. It will be appreciated that although KV pairs 133 and KV pairs 135 may be different KV pairs, the same column 136 is shown in FIG. 2 to illustrate information that may be used to link information in column 132 with information in column 131. A value 132 of a KV pair 133 may comprise a lookupCreateTime associated with a particular object and/or bucket indicated in column 136.

An initial storage operation 143 to create an object KV pair 140 may write a corresponding lookup KV pair 135 and an associated LookupValidatorJob KV pair 139 in a batch such that the Lookup-KV pair field 138 setisTrusted is set to FALSE. As an example, instructions executed by the batch operation at time $T_1$ at OOS being referred to as Site 2:

{PUT (Lookup-KV bucket object)→(isTrusted=false, lookupCreateTime=$T1$, OOS=Site2), PUT (LookupValidatorJob RunAfterTime={$T1$+Max-OperationTime} bucket object)→(lookupCreateTime=$T1$)} EQ. 1

An object information consistency determination operation may be run by a scanner instance, module, service, application, or other operation at a BOS according to LookupValidatorJob 133 when a current time is greater than or equal to a RunAfterTime value 132 that corresponds to the created lookup KV pair 135. Executing an object information consistency determination operation may comprise loading the created lookup KV pair value 135 from a database at the BOS. If a determination is made that the created lookup KV does not exist, the lookup KV pair may be deemed as stale and the BOS may remove the stale lookup KV pair.

If a lookup KV pair 135 is determined to exist, the BOS may confirm that a LookupCreateTime indicated in field 137 of the lookup KV pair matches a create time that is stored in the associated object information consistency determination key-value pair 133. Checking that create times indicated in columns 131 and 132 match may facilitate determining that the object information consistency determination key-value pair 133 and corresponding lookup-KV pair 135 were written from the same operation. If create times in columns 131 and 132 do not match, lookup KV pair 135 may be deemed stale and may be removed.

If a lookup KV pair 135 is determined to exist and is deemed to not be stale, BOS 105 may send a request message to OOS 110 to retrieve object information from object-KV pair 140 corresponding to the lookup KV pair. If an object KV pair 140 corresponding to a lookup KV pair 135 does not exist then the lookup KV pair is deemed to be dangling and may be removed and the associated object information consistency determination key-value pair 133 may be removed.

If a lookup KV pair 135 is determined to exist and is deemed to not be stale and if object-KV pair 140 is determined to exist, the lookup KV may be updated to comprise metadata that may be indicated in the KV pair 135 obtained by BOS 105 from the object KV 140 and the isTrusted flag 138 may be set to TRUE in the lookup KV pair. The result of updating KV pair 135 to include metadata associated with an object and to have the object information consistency state indication 138 being set to TRUE results in the lookup KV pair value information being usable to perform a future object information operation (e.g., a look up operation or a listing operation) responsive to a future request 134. After KV pair 135 has been updated and flag 138 has been set to TRUE, KV pair 133 may be flushed or removed from BOS 105.

In an example embodiment, a delete object operation 143 may be performed with respect to an existing object and a lookup KV pair 135 may be updated to keep the lookup KV pair value consistent with a state of the object (e.g., the state of the object is that the object has been deleted and does not exist at an OOS 110). BOS 105 may update the lookup-KV pair 135 to set isTrusted flag 138 to FALSE and may indicate a new create time 137 in an associated LookupValidatorJob such that execution delay period indication 132 corresponds to, or is derived based on, the new create time. OOS 110 may remove the object-KV pair 140. The scanner application may execute according to the updated execution delay period indication 132 and the lookup-KV may be removed.

Accordingly, example embodiments disclosed herein may facilitate, responsive to a request 134, BOS 105 listing lookup-KV pair value information but the BOS may only need to verify information corresponding to KV pairs 135 that have not already been validated (e.g., the BOS may only need to validate, with an OSS 110, object information corresponding to KV pairs with respect to which flag 138 is set to FALSE) and object information corresponding to KV pairs 135 that have already been validated (e.g., flag 138 is set to TRUE) can be immediately listed in listing 112 without the BOS having to communicate with an OOS 110 to obtain object information 149, which may comprise metadata corresponding to at least one object as shown in column 141 of FIG. 2. In a best-case scenario, flag 138 in all KV pairs 135 corresponding to a bucket are set to TRUE and an entire listing 112 can be performed from the listing/lookup KV pairs 135 in the BOS with no requests to other sites of confederation 125 being needed.

If a lookup KV pair exists with flag 138 set to TRUE, BOS 105 can safely assume that the lookup-KV pair 135 and corresponding object-KV pair 140 both exist. Furthermore, an object information consistency determination operation cannot have executed during a storage operation 143 or used stale information for an update because the object information consistency determination operation (e.g., updating of flag 138 from FALSE to TRUE) does not execute before a time that is equal to or greater than the time that the lookup KV pair was created plus the maximum time that an OOS 110 may be configured to perform an operation. If a lookup KV pair 135 exists and corresponding flag 138 is set to FALSE then the object information operation (e.g., listing operation) may look up and return a latest state of an object-KV pair 140 corresponding to the lookup KV pair 135. Thus, latest metadata is returned in response to a request 134 and listing in list 112 by BOS 105 of object information indicated by dangling KV pairs is avoided. Speed at which list 112 may be provided is increased because validation of every lookup KV pair with an OOS 110 in response to a request 134 may not need to be performed. (It is possible, however, that some KV pairs with respect to which flag 138 is set to FALSE may need to be validated in-line in response to a request 134 but typically many KV pairs 135 may have already been validated by the time a request 134 is generated at BOS 105). Assuming the BOS 105 has enough resource availability, the number of dangling lookup-KV pairs 135 may be TimeOfListing−MaxOperationTime<lookupCreateTime≤TimeOfListing. The majority of lookup KV pairs 135 not requiring in-line validation after a request 134 is generated may result from a majority of users of objects having objects stored at an OOS 110 that have storage dates older than MaxOperationTime 139. For example, MaxOperationTime 139 could be two hours and a user could be writing millions of objects every day for years. Thus, at BOS 105, object information in KV pairs 135 associated with most of the objects saved by the user may have been set to TRUE for many years and flag 138 in these KV pairs 135 should have been TRUE for many years also.

An update to an existing object or a deletion of an object can skip creating a LookupValidatorJob in the situation that BOS 105 and OOS 110 are the same site because the operations performed with respect to lookup-KV pairs 135 and object-KV pairs 140 can be done atomically in a batch operation. An initial create operation may comprise batch updating to avoid race conditions from two concurrent create requests.

After a successful create, update, or delete operation 143, execution of an object information consistency determination operation may be triggered without needing to wait for the configured execution delay period to elapse. This can be done safely because a LookupCreateTime associated with an object-KV pair 140 corresponding to an object that has just been written can be sent to BOS 105 and the BOS can compare a LookupCreateTime received from an OOS 110 to a LookupCreateTime indicated by a corresponding lookup-KV pair 135 to confirm that the object KV pair and the lookup KV pair are both associated with the same operation 143. Triggering of such immediate executing should not be tried for failed operations 143 because if a response to a request 147 to cause operation 143 to create an object-KV pair 140 fails, or is not successfully transmitted to BOS 105, an object-KV may have nevertheless been written and the response may have been lost. Thus, the premise is strengthened that a majority of lookup-KV pairs 135 will be trusted because the untrusted lookup KV pairs typically result from failed operations during a previous MaxOperationTime time window. Because updating of a flag 138 from FALSE to TRUE can execute shortly after a successful operation 143, the number of untrusted Lookup-KV pairs (e.g., flag 138 being set to FALSE) corresponding to successful operations 143 is negligible.

Immediate execution of updating of a flag 138 from an initial value of FALSE to TRUE with respect to successful operations 143 can be done synchronously or asynchronously. The latter can be beneficial to minimize latency with respect to performing an operation in response to a request 143. If immediate execution fails, then a flag 138 associated with a lookup-KV pair may still be updated to a correct state when an object information consistency determination operation is executed after a configured execution delay period. A configured execution delay period value may be stored in the lookup-KV pair 135 to facilitate deletion of the lookup-KV pair after immediate execution of an object information consistency determination operation to minimize resource usage of a scanner application that may execute the object information consistency determination operation because the number of stale lookup KV pairs to be analyzed is minimized.

Accordingly, according to example embodiments disclosed herein, create, update, and delete operations 143 can be executed quickly and can return without guaranteeing that object KV pairs 140 and lookup KV pairs 135 are consistent, but with a high likelihood that consistency will eventually occur with respect to computing systems which lack the ability for atomic or transactional operations with respect to multiple sites. Background mechanisms that may change object information consistency state indications 138 to a correct state do not need to complete for other CRUD operation with respect to an object to be successful.

Figure 3A:
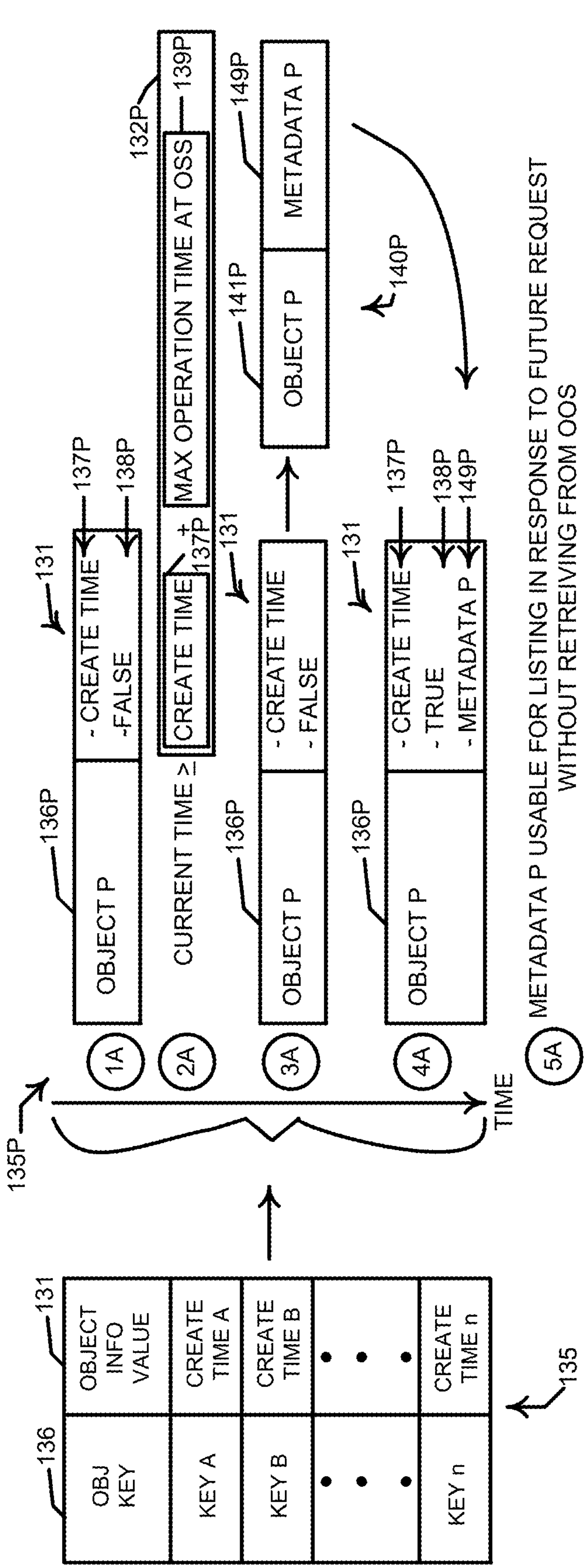
FIG. 3A illustrates an example embodiment updating, at a bucket owner computing system, an example object information key value pair with object information received from an object owner computing system.

Turning now to FIG. 3A, the figure illustrates an example embodiment to update, at a bucket owner computing system 105, an example object information key value pair 135 with object information received from at least one object owner computing system 110. At act 1A, an object information lookup KV pair 135P may be created in response to an object create request 147 as shown in FIG. 1. Key value pair 135P, created at act 1A shown in FIG. 3A, may comprise a key in field 136P indicative of an object P created, or to be created, in response to request 147. Key value pair 135P may comprise a create time value in field 137P corresponding to creation of key value pair 135P. Key value pair 135P may comprise an object information consistency state indication in field 138P that is initially set to FALSE at act 1A. At act 2A, the BOS may determine that a current time, or a present time, at the BOS, equals or exceeds a time value that may be based on a sum of a configured execution delay period that may be based on the object information key-value pair creation time value from field 137P and a maximum operating time 139P corresponding to a maximum time needed to perform as operation at an OOS to which the object was stored according to operation 143. Upon determining that the current time is equal to or greater than the configured execution delay period value, the BOS 105 may execute an object information consistency determination operation according to the at least one object information consistency determination key-value pair 138P with respect to the at least one owner object computing system 110 (e.g., the BOS may request, from the OOS, object information such as, for example, metadata corresponding to the object created as a result of request 147 and corresponding create operation 143). At act 3A, the BOS may request, from at least one OSS 110, metadata 149P, or other object information, associated in an object key-value pair 140P with an object indicated in field 141P, wherein creation of the object was requested by request 147 and created by a corresponding create action 143. At act 4A, the BOS may update object information KV pair 135P to include metadata 149P received from at least one OOS 110 and the BOS may update the object information consistency state indication 138P from being indicative FALSE to being indicative of TRUE. At act 5A, metadata 149P may be usable in providing a listing 112, shown in FIG. 1, indicative of bucket information corresponding to a future lookup request 134 (e.g., a request 134 that is received or generated after act 4A) without the BOS needing to retrieve metadata 149P is response to the future request 134.

Figure 3B:
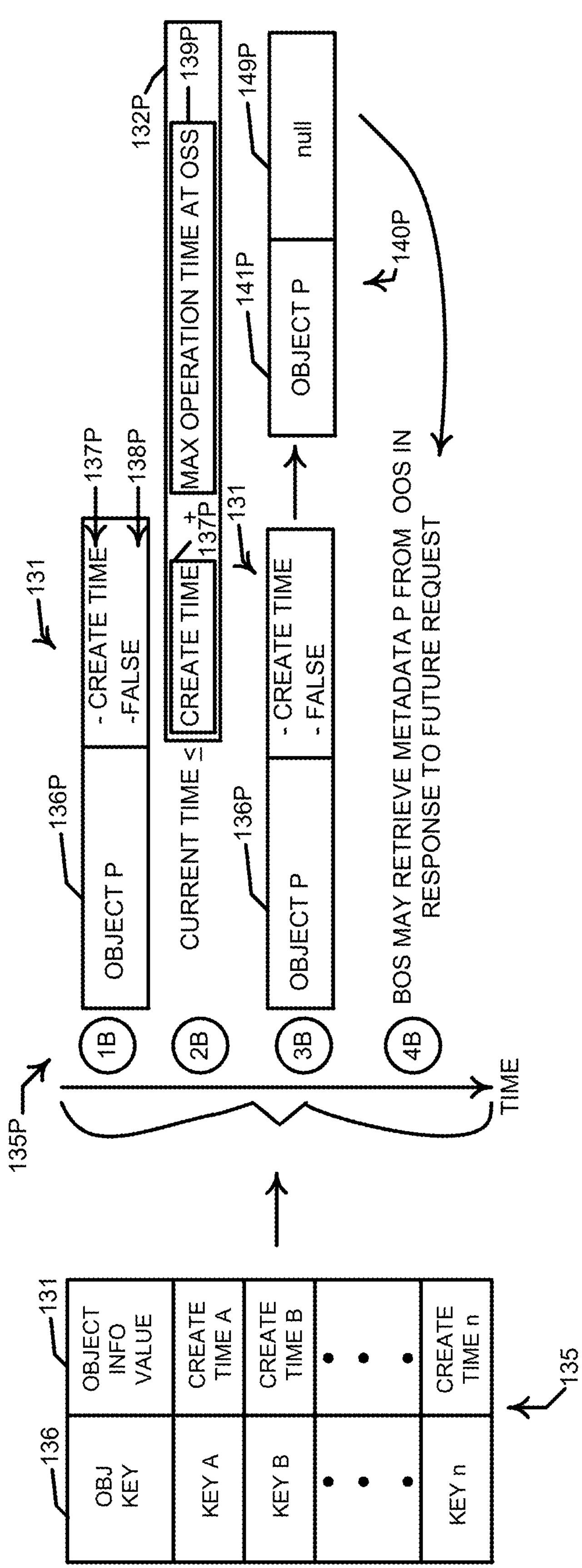
FIG. 3B illustrates an example embodiment avoiding updating or using, at a bucket owner computing system, object information corresponding to an example object information key value pair.

FIG. 3B illustrates an example embodiment wherein a BOA 105 avoids updating or using object information corresponding to an example object information key value pair that may not have a flag 138 set to TRUE. At act 1B, an object information lookup KV pair 135P may be created in response to an object create request 147 as shown in FIG. 1. Key value pair 135P, created at act 1B shown in FIG. 3B, may comprise a key in field 136P indicative of an object P created, or to be created, in response to request 147. Key value pair 135P may comprise a create time value in field 137P corresponding to creation of key value pair 135P. Key value pair 135P may comprise an object information consistency state indication in field 138P that is initially set to FALSE at act 1B. At act 2B, in response to receiving a request 134 for a listing 112 of bucket object information, the BOS may determine that a current time, or a present time, at the BOS, equals or is less than a time value 132P that may be based on a sum of a configured execution delay period that may be based on the object information key-value pair creation time value from field 137P and a maximum operating time 139P corresponding to a maximum time needed to perform as operation at an OOS to which the object was stored according to operation 143. Upon determining that the current time is equal to or less than the configured execution delay period value 132P, the BOS may request, at act 3B, from at least one OSS 110, metadata 149P, or other object information, associated in an object key-value pair 140P with an object indicated in field 141P, wherein creation of the object was requested by request 147 and created by a corresponding create action 143. At act 4B, in response to request 134, the BOS may generate list 112 that includes metadata 149P received from at least one OOS, wherein request 134 may have been generated before a time corresponding to a time indicated by field 132P.

Figure 3C:
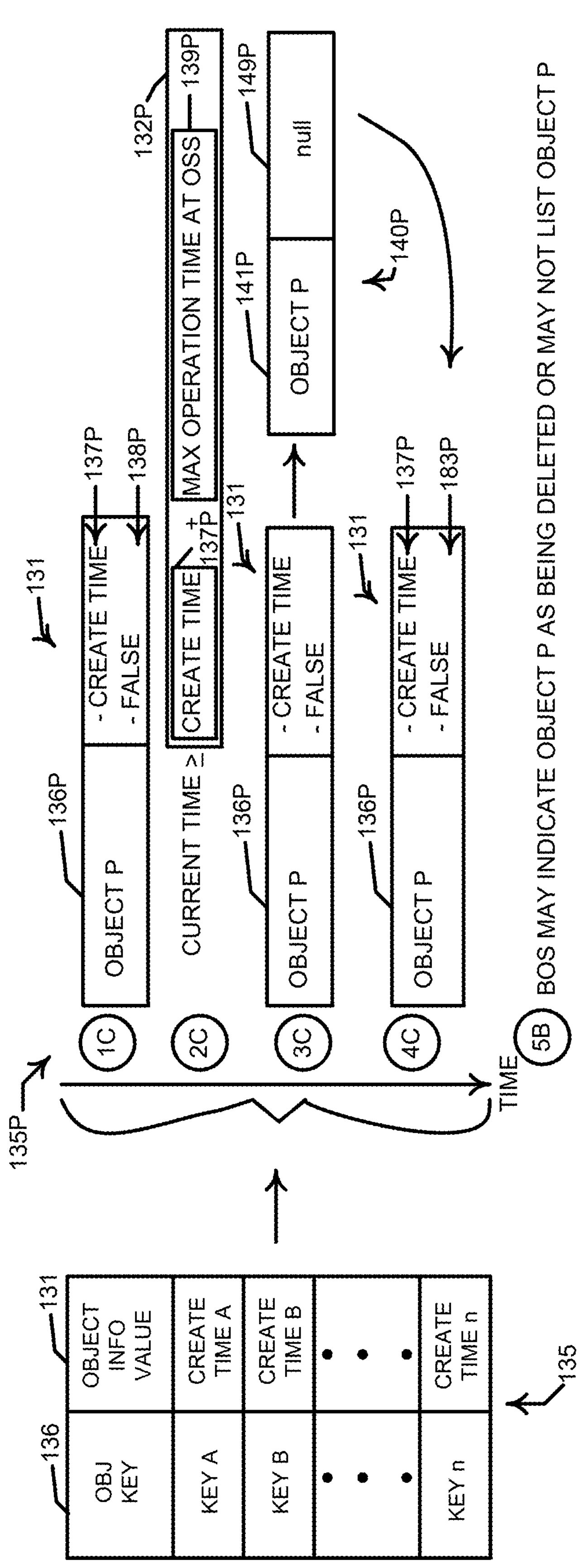
FIG. 3C illustrates an example embodiment using, at a bucket owner computing system, some object information corresponding to an example object information key value pair and using some example object information retrieved from an object owner computing system.

Turning now to FIG. 3C, the figure illustrates an example embodiment to update, at a bucket owner computing system 105, an example object information key value pair 135 with object information received from at least one object owner computing system 110. At act 1C, an object information lookup KV pair 135P may comprise a key in field 136P indicative of an object P that may have been previously created. Key value pair 135P may comprise a create time value in field 137P corresponding to creation, or updating, of key value pair 135P in response to a request 147 to perform a storage operation 143, for example, a delete operation with respect to an object indicated by filed 136P. Key value pair 135P may comprise an object information consistency state indication in field 138P that is set to FALSE. At act 2C, the BOS may determine that a current time, or a present time, at the BOS, equals or exceeds a time value 132P that may be based on a sum of a configured execution delay period indication that may be based on the object information key-value pair creation time value from field 137P and a maximum operating time 139P corresponding to a maximum time needed to perform as operation at an OOS to which the object was stored according to operation 143. Upon determining that the current time is equal to or greater than the configured execution delay period value 132P, the BOS may execute an object information consistency determination operation according to the at least one object information consistency determination key-value pair 138P with respect to the at least one owner object computing system (e.g., the BOS may request, from the OOS, object information such as, for example, metadata corresponding to the object created as a result of request 147 and corresponding create operation 143). At act 3C, the BOS may request, from at least one OSS 110, metadata 149P, or other object information, associated in an object key-value pair 140P with an object indicated in field 141P, wherein creation of the object was requested by request 147 and created by a corresponding create action 143. Due to the object indicated by field 136P being deleted at the OOS, the OOS may not have a record corresponding to Object P indicated by field 136P, or may have a record having an indication of Object P in field 141P, but object information corresponding to Object P may be nonexistent, or 'null.' At act 4C, the BOS may update object information KV pair 135P to include an indication that metadata 149P corresponding to Object P does not exist. At act 5C, a listing generated in response to a future lookup request 134 may not include object information corresponding to Object P or may indicate that the object has been deleted.

FIG. 4 illustrates an example object key-value pair 140 and an example lookup key-value pair 135, which may correspond to an object owner computing system 110 and a bucket owner computing system 105, respectively. OOS 110 and BOS 105 may be part of a federation 125 that is operated by organization, for example, a law firm or other organization that may facilitate storage and retrieval of legal object KV pair 140 may comprise a key field 141 and a value field 148. Key field 141 may comprise a bucket name value and an object name value, for example, an object (e.g., a file) may be indicated by an identifier such as, for example, "Grandpa's Will." The bucket name value may be usable to respond to a look up request, for example, a request at act 3A, as described in reference to FIG. 3A, for wills stored by OOS 110. Value field 148 may comprise metadata 149 corresponding to, and indicative of, the object, indicated by field 141, having the identifier "Grandpa's Will." Field 136 of look up key value pair 135 may comprise similar information as field 141 of object key value pair 140. Value field 131 may comprise a time created value 137 indicative of a time that key value pair 135 was created. Field 131 may comprise metadata 149, that may have been retrieved from OOS 110, corresponding to an object indicated by field 136 if an object information consistency determination operation has been performed to determine that the metadata indicated by key value pair 135 is consistent with metadata indicated by key value pair 140. If a determination has been made that the metadata indicated by key value pair 135 is consistent with metadata indicated by key value pair 140, object information consistency state indication 138 may be TRUE, whereas is the metadata has not been determined to be consistent, indication/flag 138 may be set to FALSE.

Figure 5:
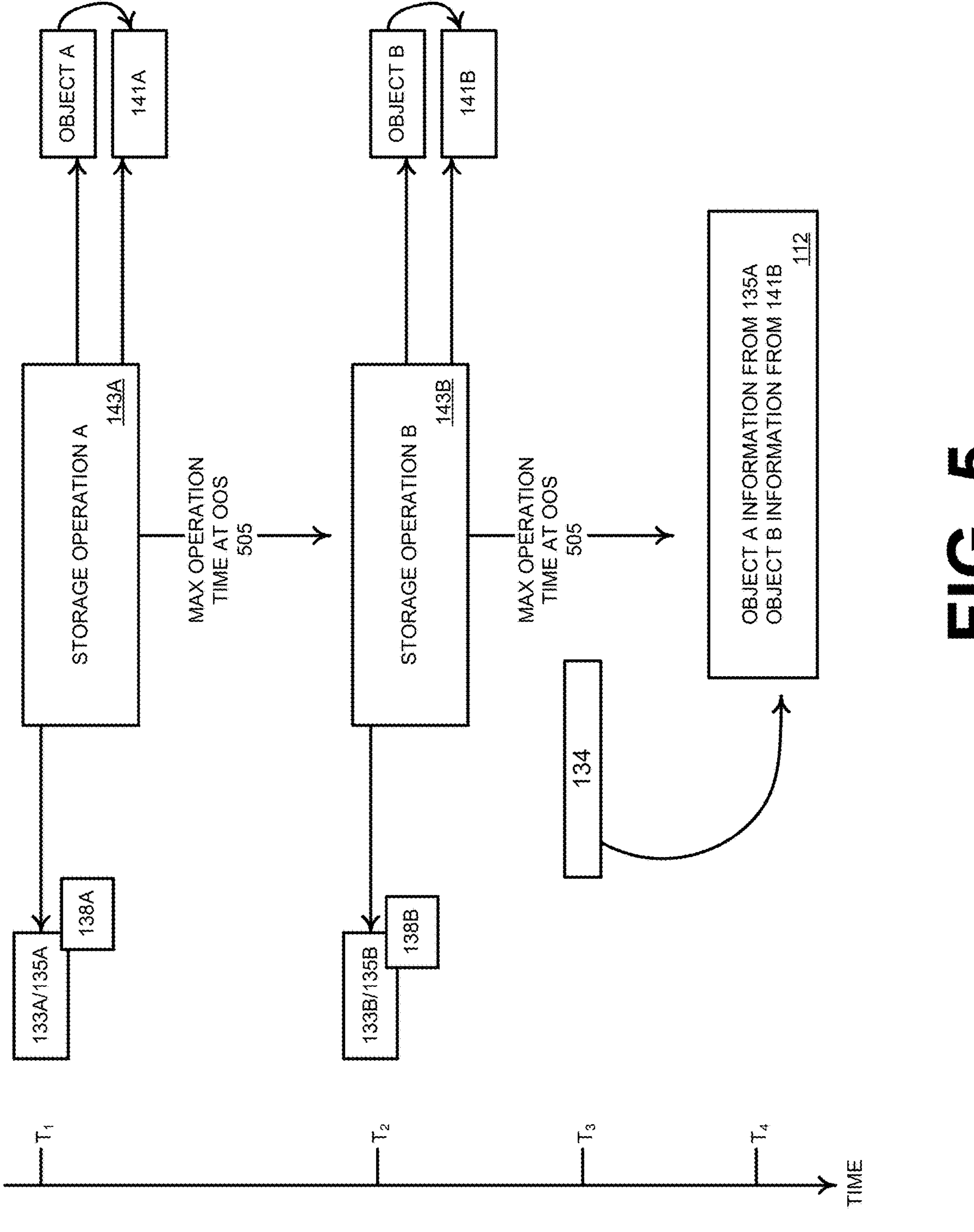
FIG. 5 illustrates an example performing of an example object information operation.

FIG. 5 illustrates an example performing of an example object information operation, for example a listing 112 of object information corresponding to bucket requested by a request 134 shown in FIG. 1. At or about time $T_1$, a storage operation 143A, for example a create operation to create an Object A, may be initiated. Storage operation 143A may comprise generating an information object key value pair 135A corresponding to Object A and an object information consistency determination key-value pair 133A corresponding to Object A. As discussed in reference to FIG. 2, key value pairs 133A and 135A, or values corresponding to the key value pairs, may be combined into a single key value pair associated with an identifier indicative at least of object A. At or about time $T_1$, Object A may be created at a BOS and object key value pair 141A, corresponding to object A, may be created and may comprise object information, for example metadata, corresponding to Object A.

After storage operation 143A, time may pass such that time $T_2$ occurs after time $T_1$ plus a time 505 needed to perform an operation at the object owner computing system. At or about time $T_2$, a storage operation 143B, for example a create operation to create an Object B, may be initiated. Storage operation 143B may comprise generating an information object key value pair 135B corresponding to Object B and an object information consistency determination key-value pair 133B corresponding to Object B. As discussed in reference to FIG. 2, key value pairs 133B and 135B, or values corresponding to the key value pairs, may be combined into a single key value pair associated with and an identifier indicative at least of Object B. At or about time $T_2$, Object B may be created and object key value pair 141B, corresponding to Object B, may be created and may comprise object information, for example metadata, corresponding to Object B.

After storage operation 143B, time may pass such that time $T_3$ occurs after time $T_2$ but before an additional amount of time needed to perform an operation at the object owner computing system has passed. At time $T_3$, a request 134 (described in reference to FIG. 1) may be generated requesting an object information operation, for example, a lookup or listing of object information associated with at least one object that may be stored at at least one OOS 110 and that may correspond to at least one bucket characteristic, or at least one bucket, managed by a BOS 105. In the example shown in FIG. 5, Object A and Object B may both correspond to a bucket indicated by request 134. Because time $T_3$ occurs at a current time that is greater than a creation time corresponding to operation 143A plus maximum operation time 505, object information consistency state indication 138A may have been set to TRUE as described elsewhere herein. However, because time $T_3$ occurs at a current time that is less than a creation time corresponding to operation 143B plus maximum operation time 505, object information consistency state indication 138B may not yet have been set to TRUE as described elsewhere herein. Accordingly, responsive to request 134, the bucket owner computing system may generate a listing 112 of object information that may comprise object information corresponding to Object A and Object B, wherein the bucket owner computing system lists in list 112 object information corresponding to Object A retrieved from object information key value pair 135A that is present at the bucket owner computing system but the bucket owner computing system may list in list 112 object information corresponding to Object B that is retrieved from at least one object computing system after request 134 at time T3. Thus, according to embodiments described herein, compared to conventional techniques, responding to request 134 to generate list 112 may take less time because object information corresponding to object A is readily available at the bucket owner computing system at time T3 thus messaging back and forth between the bucket owner computing system and the at least one object owner computing system is not needed after time T3 although messaging back and forth between the bucket owner computing system and the at least one object owner computing system may be needed to obtain object information corresponding to object B object information key value pair that 135B may not, at time T3, include a TRUE indication in object information consistency state indication field 138B.

Figure 6:
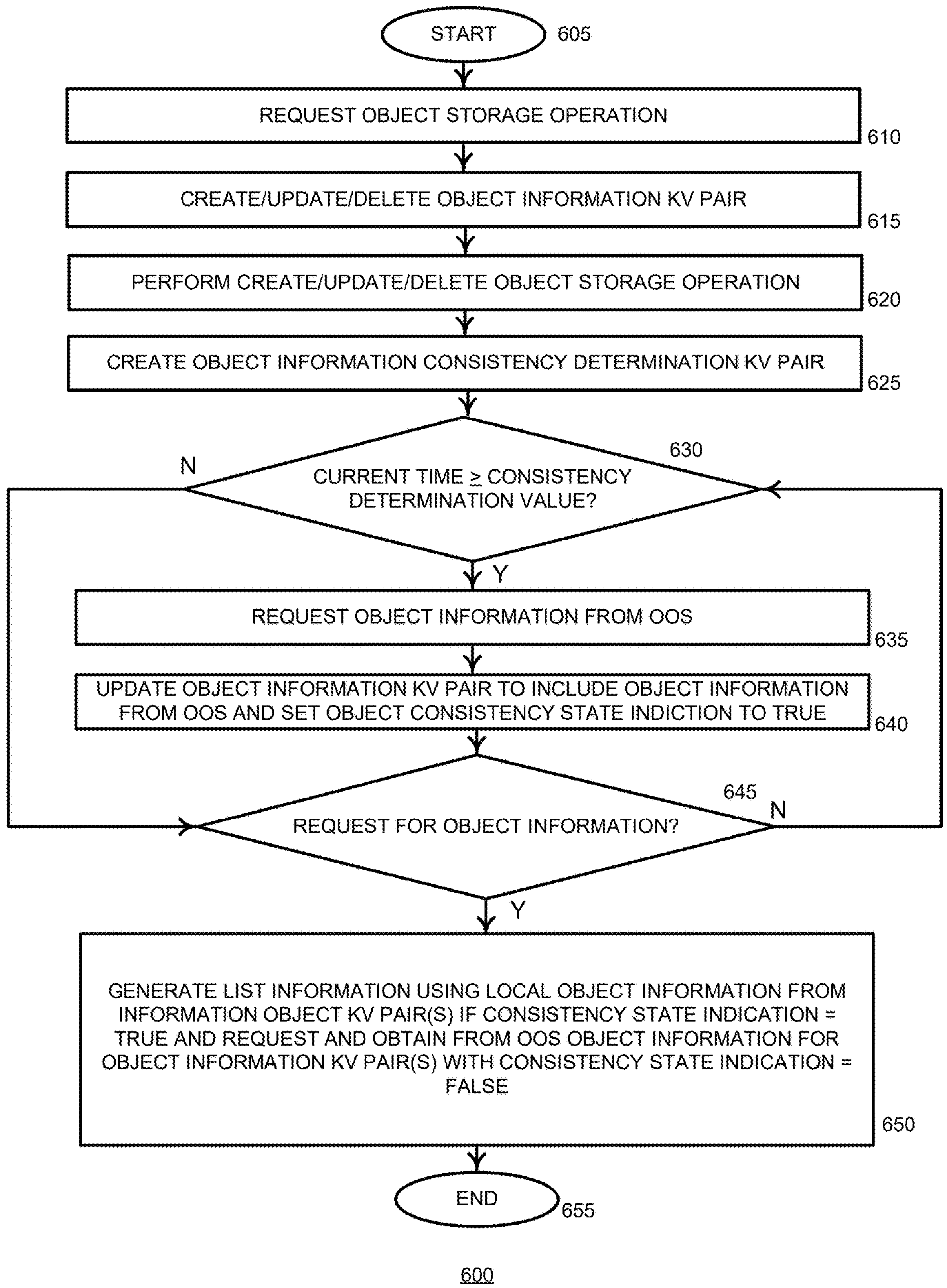
FIG. 6 illustrates a flow diagram of an example embodiment to update lookup key-value pairs at a bucket owner computing system for use in performing object information operations.

Turning now to FIG. 6, the figure illustrates a flow diagram of an example embodiment method 600 to update object information/lookup key-value pairs (e.g., KV pairs 135) at a bucket owner computing system 105 for use in performing object information operations, such as generating a list of object information corresponding to at least one object, that may be stored at at least one OOS 110, associated with at least one bucket characteristic. Method 600 begins at act 605. At act 610, an object storage operation (e.g., operation 143 shown in FIG. 1) may be requested. The object storage operation may be requested by a user of a bucket owner computing system or an object owner computing system, both of which may be part of a computing system federation, such as federation 125 described in reference to FIG. 1. At act 615, responsive to, or in connection with, the object storage operation request at act 610, a bucket owner computing system may create or update an object information key value pair, for example key value pair 135 described in reference to FIG. 1. The object information key value pair may comprise an information field usable to indicate an object information consistency state indication (e.g., indication 138) indicative of at least one object information consistency state corresponding to object information that may be stored, or indicated by, the object information key value pair. When an object information key value pair is initially created at act 615, the object information consistency state indication may be set to a value of FALSE. At act 620, responsive to the object storage operation request at acts 610, an object owner computing system may perform a requested object storage operation, which operation may be at least one of a create object operation, an update of an existing object operation, or a delete an existing object operation.

At act 625, the bucket owner computing system may create an object information consistency determination key value pair, for example key value pair 133 described in reference to FIG. 2. As described in reference to FIG. 2, key value pair 133 and key value par 135 may comprise values that correspond to an object created, updated, or deleted at act 620, or value information corresponding to key values 133 and 135 may simply be part of a single key value pair associated with the object storage operation performed at act 620.

At act 630, the bucket owner computing system may determine whether a current time at the bucket owner computing system is greater than or equal to a consistency determination value included in object information key value pair 133. The consistency determination value may comprise a value 139 corresponding the storage operation performed at act 620, as described in reference to FIG. 2, requested at act 610. The consistency determination value make comprise a time value that is a sum of a time at which the object information key value pair was created or updated at act 615 plus a maximum operation time, which may be a configured value, that corresponds to a time needed for an object owner computing system to perform an operation or to time out if the operation has not been performed. If a determination is made at act 630 that a current time at the bucket owner computing system is greater than or equal to the consistency determination value, method 600 may advance to act 635. At act 635, the bucket owner computing system may request (e.g., request 134 shown in FIG. 1), from at least one object owner computing system that corresponds to the object, which may be the object that was the subject of the storage operation at act 620, object information, for example metadata, corresponding to, or indicative of, the object.

At act 640, the bucket owner computing system may update an object information value field in an object information key value pair 135 with metadata, corresponding to the object, received from the object owner computing system responsive to the request at act 635. For example, with respect to the object created, updated, or deleted at act 620, BOS 105 may update a field 131 of KV pair 135 with metadata 149 received from an object owner computing system, as shown in FIG. 3A. In addition, at act 640, upon receiving object information/metadata from the object owner computing system, the bucket owner computing system may change the object information consistency state indication, which may have been set to FALSE at act 615, to TRUE.

Returning to description of act 630, if a determination is made that a current time is less than or equal to the consistency determination value, method 600 advances to act 645.

Regardless of whether act 645 is reached immediately following performing act 630 or after performing acts 635 and 640, at act 645 the bucket owner computing system may determine whether a request for object information, such as request 134 that may be generated by a user corresponding to the bucket computing system, may have been received or generated at the bucket owner computing system. If a determination is made at act 645 that a request has not been received or generated at the bucket owner computing system, method 600 returns to act 630. If a determination is made at act 640 that a request has been received or generated at the bucket owner computing system, method 600 advances to act 650.

At act 650, the bucket owner computing system may generate a list (e.g., list 112) of object information corresponding to, or indicative of, objects associated with a bucket, or at least one bucket characteristic requested by the request determined at act 645 to have been received or generated at the bucket owner computing system. In generating the object information list at act 650, the bucket owner computing system may generate object information using local object information corresponding to at least one object with respect to which an object consistency state indication in an object information key value pair corresponding to the at least one object is set to TRUE. Responsive to a request for object information corresponding to a bucket, if a consistency state indication in an object information key value pair corresponding at least one object is FALSE, the bucket owner computing system may request from at least one object owner computing system object information corresponding to the at least one object and include the object information received from the at least one object donor computing system in the list generated at act 650. Method 600 advances to act 655 and ends.

Turning now to FIG. 7, the figure illustrates an example embodiment method 700 comprising at block 705 generating, by at least one bucket owner computing system comprising at least one processor, at least one object information key-value pair comprising object information corresponding to at least one storage operation performed by at least one object owner computing system with respect to at least one object, wherein the at least one object information key-value pair comprises at least one object information consistency state indication indicative of at least one object information consistency state corresponding to the object information; at block 710 generating, by the at least one bucket owner computing system, at least one object information consistency determination key-value pair, corresponding to the at least one object information key-value pair, comprising at least one object information key-value pair creation time indication indicative of at least one object information key-value pair creation time corresponding to the generating of the at least one object information key-value pair; at block 715 based on the at least one object information consistency state indication and after a configured execution delay period that is based at least on the at least one object information key-value pair creation time, executing, by the at least one bucket owner computing system according to the at least one object information consistency determination key-value pair with respect to the at least one object owner computing system, at least one object information consistency state determination operation with respect to the at least one object information consistency state, to result in at least one determined object information consistency state; and at block 720 based on the at least one determined object information consistency state, performing, by the at least one bucket owner computing system, at least one object information operation with respect to the object information associated with the at least one object information key-value pair.

Turning now to FIG. 8, the figure illustrates a bucket owner computing system, comprising at block 805 at least one processor configured to process executable instructions that, when executed by the at least one processor, facilitate performance of operations, comprising generating at least one lookup key-value pair comprising object information corresponding to at least one storage operation performed by at least one object owner computing system with respect to at least one object, wherein the at least one lookup key-value pair further comprises at least one object information consistency state indication indicative of at least one object information consistency state corresponding to the object information and at least one lookup key-value pair creation time indication indicative of at least one lookup key-value pair creation time corresponding to the generating of the at least one lookup key-value pair; at block 810 after a configured execution delay period that is based on the at least one lookup key-value pair creation time and an operation time to perform at least one computing operation by at least one of the at least one object owner computing system, communicating with at least one of the at least one object owner computing system to determine at least one object information consistency state of the object information, to result in at least one determined object information consistency state; at block 815 updating the at least one object information consistency state indication to be indicative of the at least one determined object information consistency state and to result in at least one updated object information consistency state indication; and at block 820 based on the at least one updated object information consistency state indication being indicative of the object information being consistent with the at least one object at the at least one object owner computing system, performing, using the at least one lookup key-value pair, at least one lookup operation with respect to the object information.

Turning now to FIG. 9, the figure illustrates a non-transitory machine-readable medium 900 comprising at block 905 executable instructions that, when executed by at least one processor of a bucket owner computing system, facilitate performance of operations, comprising generating at least one lookup key-value pair corresponding to at least one object storage operation at at least one object owner computing system with respect to at least one object, wherein the at least one lookup key-value pair comprises lookup object information corresponding to the at least one object, at least one lookup object information consistency state indication indicative of the lookup object information being inconsistent with the at least one object, and at least one lookup key-value pair creation time indication indicative of at least one lookup key-value pair creation time corresponding to the generating of the at least one lookup key-value pair; at block 910 communicating with at least one of the at least one object owner computing system after a configured execution delay period, that is based on the at least one lookup key-value pair creation time and a maximum operation time to perform at least one computing operation by at least one of the at least one object owner computing system, to determine at least one determined lookup object information consistency state indication indicative of a consistency of the lookup object information with respect to the at least one object; and at block 915 based on the at least one determined lookup object information consistency state indication, responsive to at least one lookup request, performing at least one lookup operation with respect to the at least one lookup key-value pair.

Figure 10:
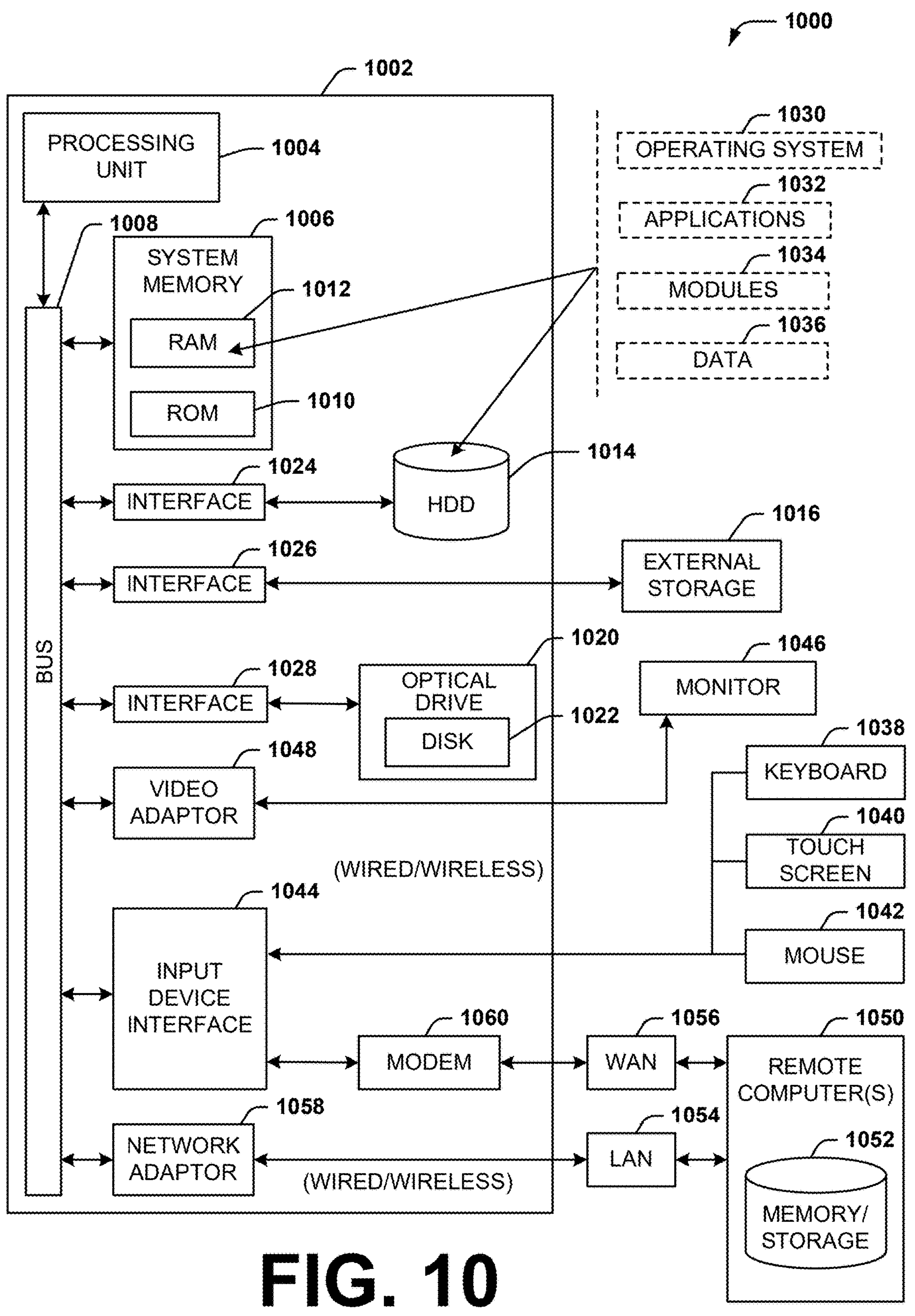
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1010. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can also be connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

generating, by at least one bucket owner computing system comprising at least one processor, at least one object information key-value pair comprising object information corresponding to at least one storage operation performed by at least one object owner computing system with respect to at least one object, wherein the at least one object information key-value pair comprises at least one object information consistency state indication indicative of at least one object information consistency state corresponding to the object information;

generating, by the at least one bucket owner computing system, at least one object information consistency determination key-value pair, corresponding to the at least one object information key-value pair, comprising at least one object information key-value pair creation time indication indicative of at least one object information key-value pair creation time corresponding to the generating of the at least one object information key-value pair;

based on the at least one object information consistency state indication and after a configured execution delay period that is based at least on the at least one object information key-value pair creation time, executing, by the at least one bucket owner computing system according to the at least one object information consistency determination key-value pair with respect to the at least one object owner computing system, at least one object information consistency state determination operation with respect to the at least one object information consistency state, to result in at least one determined object information consistency state; and based on the at least one determined object information consistency state, performing, by the at least one bucket owner computing system, at least one object information operation with respect to the object information associated with the at least one object information key-value pair.

2. The method of claim 1, wherein the at least one storage operation performed by at least one object owner computing system with respect to storage of at least one object comprises at least one of: creation of the at least one object, updating of the at least one object, or deleting of the at least one object.

3. The method of claim 1, wherein the at least one determined object information consistency state corresponds to the object information associated with the at least one object information key-value pair being consistent with the at least one object.

4. The method of claim 1, wherein the at least one object information key-value pair comprises at least one object information key-value pair timestamp indicative of at least one update time corresponding to at least one update of the at least one object information key-value pair.

5. The method of claim 1, wherein the at least one object information consistency state indication is indicative that the object information associated with the at least one object information key-value pair accurately corresponds to the at least one object.

6. The method of claim 1, wherein the configured execution delay period is further based on an operation time, associated with at least one of the at least one object owner computing system, to perform at least one computing operation.

7. The method of claim 1, wherein the at least one bucket owner computing system and the at least one object owner computing system are not configured to atomically update the at least one object information key-value pair and at least one object key-value pair corresponding to the at least one object.

8. The method of claim 1, wherein the at least one object information key-value pair is usable, by the at least one bucket owner computing system, to facilitate at least:

determining an availability of the at least one object at the at least one object owner computing system, routing at least one copy, read, update, or delete request corresponding to the at least one object to at least one of the at least one object owner computing system corresponding to the object information, or generating a listing of the object information corresponding to at least one bucket to which the at least one object information key-value pair corresponds.

9. The method of claim 1, further comprising:

avoiding, by the at least one bucket owner computing system, performing the at least one object information consistency state determination operation after the at least one determined object information consistency state indication has been determined.

10. The method of claim 1, wherein the at least one object information consistency state indication is FALSE, wherein the at least one determined object information consistency state is TRUE, and wherein the executing of the at least one object information consistency state determination operation comprises changing the at least one object information consistency state indication from being FALSE to being TRUE.

11. The method of claim 10, further comprising:

receiving, by the at least one bucket owner computing system, at least one lookup request corresponding to the at least one object; and based on the at least one object information consistency state indication being determined to be TRUE, and responsive to the at least one lookup request, performing, by the at least one bucket owner computing system, the at least one object information operation without, after the executing of the at least one object information consistency state determination operation, communicating, by the at least one bucket owner computing system, with the at least one object owner computing system, wherein the performing of the at least one object information operation comprises performing a lookup or a listing of the object information corresponding to the at least one object with respect to which the at least one object information consistency state indication is TRUE.

12. The method of claim 1, further comprising:

avoiding, by the at least one bucket owner computing system, communication with the at least one object owner computing system in connection with the performing of the at least one object information operation.

13. The method of claim 1, wherein the at least one object information key-value pair comprises at least one metadata indication indicative that the at least one object information operation is to be performed with respect to metadata, associated with the at least one object, indicated by the at least one metadata indication.

14. The method of claim 1, wherein the performing of the at least one object information operation comprises, responsive to a request, performing at least one lookup operation or at least one listing operation.

15. The method of claim 1, wherein at least one of the at least one object information consistency state indication is FALSE, wherein the performing of the at least one object information operation comprises generating, by the at least one bucket owner computing system, a list of the at least one object that is available at the at least one object owner computing system, wherein, based on the at least one of the at least one object information consistency state indication being determined to be FALSE, the performing of the at least one object information operation further comprises avoiding, by the at least one bucket owner computing system, listing, in the list, the object information that corresponds to the at least one object and that is associated with at least one object information key-value pair, and wherein the method further comprises:

retrieving, by the at least one bucket owner computing system from the at least one object owner computing system, the object information corresponding to the at least one object with respect to which the at least one object information consistency state indication is FALSE, to result in retrieved object information, wherein the performing of the at least one object information operation comprises including, in the list, the retrieved object information.

16. A bucket owner computing system, comprising at least one processor configured to process executable instructions that, when executed by the at least one processor, facilitate performance of operations, comprising:

generating at least one lookup key-value pair comprising object information corresponding to at least one storage operation performed by at least one object owner computing system with respect to at least one object, wherein the at least one lookup key-value pair further comprises at least one object information consistency state indication indicative of at least one object information consistency state corresponding to the object information and at least one lookup key-value pair creation time indication indicative of at least one lookup key-value pair creation time corresponding to the generating of the at least one lookup key-value pair;

after a configured execution delay period that is based on the at least one lookup key-value pair creation time and an operation time to perform at least one computing operation by at least one of the at least one object owner computing system, communicating with at least one of the at least one object owner computing system to determine at least one object information consistency state of the object information, to result in at least one determined object information consistency state;

updating the at least one object information consistency state indication to be indicative of the at least one determined object information consistency state and to result in at least one updated object information consistency state indication; and based on the at least one updated object information consistency state indication being indicative of the object information being consistent with the at least one object at the at least one object owner computing system, performing, using the at least one lookup key-value pair, at least one lookup operation with respect to the object information.

17. The bucket owner computing system of claim 16, wherein the performing of the at least one lookup operation comprises indicating the object information associated with the at least one object in response to a lookup request or in response to a bucket object list request.

18. The bucket owner computing system of claim 16, wherein the at least one object information consistency state corresponds at least one state of metadata, corresponding to the at least one object and indicated by the at least one lookup key-value pair, and wherein the at least one updated object information consistency state indication comprises at least one flag set to TRUE.

19. A non-transitory machine-readable medium, comprising executable instructions that, when executed by at least one processor of a bucket computing system, facilitate performance of operations, comprising:

generating at least one lookup key-value pair corresponding to at least one object storage operation at at least one object owner computing system with respect to at least one object, wherein the at least one lookup key-value pair comprises lookup object information corresponding to the at least one object, at least one lookup object information consistency state indication indicative of the lookup object information being inconsistent with the at least one object, and at least one lookup key-value pair creation time indication indicative of at least one lookup key-value pair creation time corresponding to the generating of the at least one lookup key-value pair;

communicating with at least one of the at least one object owner computing system after a configured execution delay period, that is based on the at least one lookup key-value pair creation time and a maximum operation time to perform at least one computing operation by at least one of the at least one object owner computing system, to determine at least one determined lookup object information consistency state indication indicative of a consistency of the lookup object information with respect to the at least one object; and based on the at least one determined lookup object information consistency state indication, responsive to at least one lookup request, performing at least one lookup operation with respect to the at least one lookup key-value pair.

20. The non-transitory machine-readable medium of claim 19, wherein the at least one object storage operation comprises at least one of: at least one delete operation with respect to the at least one object or at least one update operation with respect to the at least one object, wherein the at least one lookup key-value pair comprises at least one updated lookup key-value pair comprising at least one updated lookup object information consistency state indication, indicative of the lookup object information being inconsistent with the at least one object, wherein the at least one updated lookup key-value pair comprises at least one updated lookup key-value pair creation time value indication indicative of at least one updated lookup key-value pair creation time corresponding to the at least one updated lookup key-value pair, and wherein, based on the at least one updated lookup object information consistency state indication being indicative of the lookup object information being inconsistent with the at least one object, the performing of the at least one lookup operation comprises:

avoiding listing of the lookup object information.

* * * * *